United States Patent
Okada et al.

(10) Patent No.: US 10,291,505 B2
(45) Date of Patent: May 14, 2019

(54) METHOD AND APPARATUS FOR PACKET ANALYSIS

(71) Applicant: FUJITSU LIMITED, Kawasaki-shi, Kanagawa (JP)

(72) Inventors: Sumiyo Okada, Kawasaki (JP); Yuji Nomura, Kawasaki (JP); Fumiyuki Iizuka, Kawasaki (JP); Hirokazu Iwakura, Adachi (JP); Naoyoshi Ohkawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 15/649,918

(22) Filed: Jul. 14, 2017

(65) Prior Publication Data
US 2018/0048552 A1  Feb. 15, 2018

(30) Foreign Application Priority Data
Aug. 15, 2016 (JP) .................. 2016-159074

(51) Int. Cl.
*H04L 12/26* (2006.01)

(52) U.S. Cl.
CPC ........... *H04L 43/10* (2013.01); *H04L 43/022* (2013.01); *H04L 43/028* (2013.01); *H04L 43/106* (2013.01); *H04L 43/12* (2013.01); *H04L 43/04* (2013.01); *H04L 43/06* (2013.01); *H04L 43/08* (2013.01); *H04L 43/0876* (2013.01); *H04L 43/16* (2013.01); *H04L 43/18* (2013.01)

(58) Field of Classification Search
CPC ......... H04L 43/04; H04L 43/06; H04L 43/08; H04L 43/0876; H04L 43/10; H04L 43/12; H04L 43/18; H04L 43/022; H04L 43/028; H04L 43/106; H04L 43/16
See application file for complete search history.

(56) References Cited

U.S. PATENT DOCUMENTS

| | | | | |
|---|---|---|---|---|
| 5,757,772 A | * | 5/1998 | Thornberg | H04W 24/00 370/236 |
| 8,009,599 B2 | * | 8/2011 | Igarashi | H04B 1/0475 370/310.2 |

(Continued)

FOREIGN PATENT DOCUMENTS

| JP | 2009-141535 | 6/2009 |
|---|---|---|
| JP | 2010-063000 | 3/2010 |
| JP | 2013-255059 | 12/2013 |

*Primary Examiner* — Steven H Nguyen
(74) *Attorney, Agent, or Firm* — Fujitsu Patent Center

(57) ABSTRACT

A computer obtains a first packet group transmitted wirelessly by a first wireless communication apparatus and a second packet group transmitted wirelessly by a second wireless communication apparatus. The computer then detects a first non-communication period, during which there are no packets transmitted by the first wireless communication apparatus for a prescribed time or longer, and also detects a second non-communication period, during which there are no packets transmitted by the second wireless communication apparatus for the prescribed time or longer. The computer then determines based on an overlap between the first and second non-communication periods whether the first and second wireless communication apparatuses are connected to the same wireless base station.

7 Claims, 22 Drawing Sheets

(56) References Cited

U.S. PATENT DOCUMENTS

| | | | |
|---|---|---|---|
| 8,385,198 B2* | 2/2013 | Sakaguchi | H04W 74/0816 |
| | | | 370/230 |
| 8,611,268 B1* | 12/2013 | Thandaveswaran | ......... |
| | | | H04W 52/0206 |
| | | | 370/311 |
| 8,699,339 B2* | 4/2014 | Bhooma | H04L 41/5022 |
| | | | 370/232 |
| 8,989,042 B2* | 3/2015 | Chou | H04W 24/02 |
| | | | 370/252 |
| 9,351,173 B2* | 5/2016 | Giloh | H04L 12/4633 |
| 9,882,818 B2* | 1/2018 | Shao | H04L 43/087 |
| 2013/0215746 A1* | 8/2013 | Bhooma | H04L 41/5022 |
| | | | 370/235 |
| 2013/0329585 A1 | 12/2013 | Okada | |

* cited by examiner

FIG. 17

TL1 NON-COMMUNICATION PERIOD INFORMATION MANAGEMENT TABLE

| PACKET RECEIVED TIME | ATTRIBUTE (START OR END) | COMMUNICATION INFORMATION | |
|---|---|---|---|
| RECEIVED TIME OF PACKET a1 | START | WIRELESS LAN TERMINAL 21 | |
| RECEIVED TIME OF PACKET b1 | START | WIRELESS LAN TERMINAL 22 | |
| RECEIVED TIME OF PACKET a2 | START | WIRELESS LAN TERMINAL 21 | |
| RECEIVED TIME OF PACKET b2 | START | WIRELESS LAN TERMINAL 22 | |
| RECEIVED TIME OF PACKET a3 | START | WIRELESS LAN TERMINAL 21 | |
| RECEIVED TIME OF PACKET b3 | START | WIRELESS LAN TERMINAL 22 | |
| RECEIVED TIME OF PACKET b4 | START | WIRELESS LAN TERMINAL 22 | |
| RECEIVED TIME OF PACKET a4 | START | WIRELESS LAN TERMINAL 21 | |
| RECEIVED TIME OF PACKET c1 | START | WIRELESS LAN TERMINAL 23 | |
| RECEIVED TIME OF PACKET c2 | START | WIRELESS LAN TERMINAL 23 | |
| RECEIVED TIME OF PACKET c3 | START | WIRELESS LAN TERMINAL 23 | |
| RECEIVED TIME OF PACKET c4 | START | WIRELESS LAN TERMINAL 23 | |
| RECEIVED TIME OF PACKET c5 | START | WIRELESS LAN TERMINAL 23 | |
| RECEIVED TIME OF PACKET c6 | START | WIRELESS LAN TERMINAL 23 | |
| RECEIVED TIME OF PACKET a5 | END | WIRELESS LAN TERMINAL 21 | → S31 |
| RECEIVED TIME OF PACKET c7 | START | WIRELESS LAN TERMINAL 23 | |
| RECEIVED TIME OF PACKET b5 | END | WIRELESS LAN TERMINAL 22 | → S32 |
| RECEIVED TIME OF PACKET b6 | START | WIRELESS LAN TERMINAL 22 | |
| RECEIVED TIME OF PACKET b7 | START | WIRELESS LAN TERMINAL 22 | |
| RECEIVED TIME OF PACKET b8 | START | WIRELESS LAN TERMINAL 22 | |
| RECEIVED TIME OF PACKET a6 | START | WIRELESS LAN TERMINAL 21 | |
| RECEIVED TIME OF PACKET c8 | END | WIRELESS LAN TERMINAL 23 | → S33 |
| RECEIVED TIME OF PACKET c9 | START | WIRELESS LAN TERMINAL 23 | |
| RECEIVED TIME OF PACKET a7 | START | WIRELESS LAN TERMINAL 21 | |
| RECEIVED TIME OF PACKET b9 | END | WIRELESS LAN TERMINAL 22 | → S34 | t1, t2, t3, t4

TL2 CONNECTED-AP ANALYSIS INFORMATION TABLE

| COMMUNICATION INFORMATION | COMPARISON RESULT | DETERMINATION RESULT |
|---|---|---|
| WIRELESS LAN TERMINAL 21 | 100% (NON-COMMUNICATION PERIOD t1 — NON-COMMUNICATION PERIOD t2) | WIRELESS LAN TERMINAL 22 IS CONNECTED TO SAME AP, AND WIRELESS LAN TERMINAL 23 IS NOT CONNECTED TO SAME AP |
| WIRELESS LAN TERMINAL 22 | 80% (NON-COMMUNICATION PERIOD t2 — NON-COMMUNICATION PERIOD t1) | WIRELESS LAN TERMINAL 21 IS CONNECTED TO SAME AP, AND WIRELESS LAN TERMINAL 23 IS NOT CONNECTED TO SAME AP |
| | 5% (NON-COMMUNICATION PERIOD t2 — NON-COMMUNICATION PERIOD t3) | |
| | 30% (NON-COMMUNICATION PERIOD t4 — NON-COMMUNICATION PERIOD t3) | |
| WIRELESS LAN TERMINAL 23 | 10% (NON-COMMUNICATION PERIOD t3 — NON-COMMUNICATION PERIOD t2) | WIRELESS LAN TERMINAL 21 IS NOT CONNECTED TO SAME AP, AND WIRELESS LAN TERMINAL 22 IS NOT CONNECTED TO SAME AP |
| | 50% (NON-COMMUNICATION PERIOD t3 — NON-COMMUNICATION PERIOD t4) | |

FIG. 18 g1 OUTPUT RESULT

|  | WIRELESS LAN TERMINAL 21 | WIRELESS LAN TERMINAL 22 | WIRELESS LAN TERMINAL 23 |
|---|---|---|---|
| WIRELESS LAN TERMINAL 21 |  | ○ | × |
| WIRELESS LAN TERMINAL 22 | ○ |  | × |
| WIRELESS LAN TERMINAL 23 | × | × |  |

FIG. 19A     ○: CONNECTED
×: NOT CONNECTED g2 OUTPUT RESULT

METHOD AND APPARATUS FOR PACKET ANALYSIS

CROSS-REFERENCE TO RELATED APPLICATION

This application is based upon and claims the benefit of priority of the prior Japanese Patent Application No. 2016-159074, filed on Aug. 15, 2016, the entire contents of which are incorporated herein by reference.

FIELD

The embodiments discussed herein relate to a packet analysis method and a packet analysis apparatus.

BACKGROUND

In a wireless Local Area Network (LAN), a wireless LAN terminal communicates with another device via an access point, which is a wireless base station provided with a wireless repeating function.

To manage the communication quality of the wireless LAN, packets passing through a wired section of the wireless LAN may be captured and then the communication state of the wireless LAN may be analyzed.

For example, one of techniques for managing the communication quality of a wireless LAN is to monitor the operating states of wireless terminals at ports of a switching hub, according to the device identification information of the wireless terminals.

In addition, for example, there is another technique in which a plurality of wireless base stations each notify a management apparatus of the load information of the own base station, and the management apparatus compares the received load information to select a wireless base station for a connection.

Please see, for example, Japanese Laid-open Patent Publication Nos. 2010-63000 and 2009-141535.

By capturing packets in a wired section of a wireless LAN and analyzing the communication of the wireless LAN, as described above, the quality of communication between a wireless LAN terminal and a server may be confirmed.

However, packets traveling through the wired section do not carry information about access points to which the wireless LAN terminals having transmitted the packets are connected. Therefore, such conventional techniques are not able to analyze the communication quality taking the connected access points into consideration.

For example, assume that an access point has caused deterioration in the communication quality of all wireless LAN terminals connected to the access point. The conventional techniques of analyzing packets traveling through a wired section are able to detect the deterioration of the communication quality occurring in the wireless LAN terminals, but are unable to determine whether these wireless LAN terminals are connected to the same access point. Therefore, it would take time to detect that the access point is the cause of the deterioration of the communication quality.

If it is determined that the wireless LAN terminals with the deteriorated communication quality are connected to the same access point, it could be expected that the wireless LAN terminals would not be the cause of the deterioration. This eliminates the need of inspecting the wireless LAN terminals to identify the cause of the deterioration. Thus, it is possible to investigate the cause efficiently.

SUMMARY

According to one aspect, there is provided a non-transitory computer-readable recording medium storing a computer program that causes a computer to perform a process including: obtaining a first packet group and a second packet group at a prescribed point in a wired network, the first packet group being transmitted wirelessly by a first wireless communication apparatus and received by any of a plurality of wireless base stations connected to the wired network, the second packet group being transmitted wirelessly by the second wireless communication apparatus and received by any of the plurality of wireless base stations; detecting a first non-communication period and a second non-communication period, based on captured times of packets included in the first packet group and the second packet group, the first non-communication period being a time period during which there are no packets transmitted by the first wireless communication apparatus for a prescribed time or longer, the second non-communication period being a time period during which there are no packets transmitted by the second wireless communication apparatus for the prescribed time or longer; and determining, based on an overlap between the first non-communication period and the second non-communication period, whether the first wireless communication apparatus and the second wireless communication apparatus are connected to a same wireless base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 illustrates an example of a non-communication period information management table;

FIG. 18 illustrates an example of a connected-access-point analysis information table;

FIGS. 19A and 19B illustrate examples of an output result; and

DESCRIPTION OF EMBODIMENTS

Figure 1:
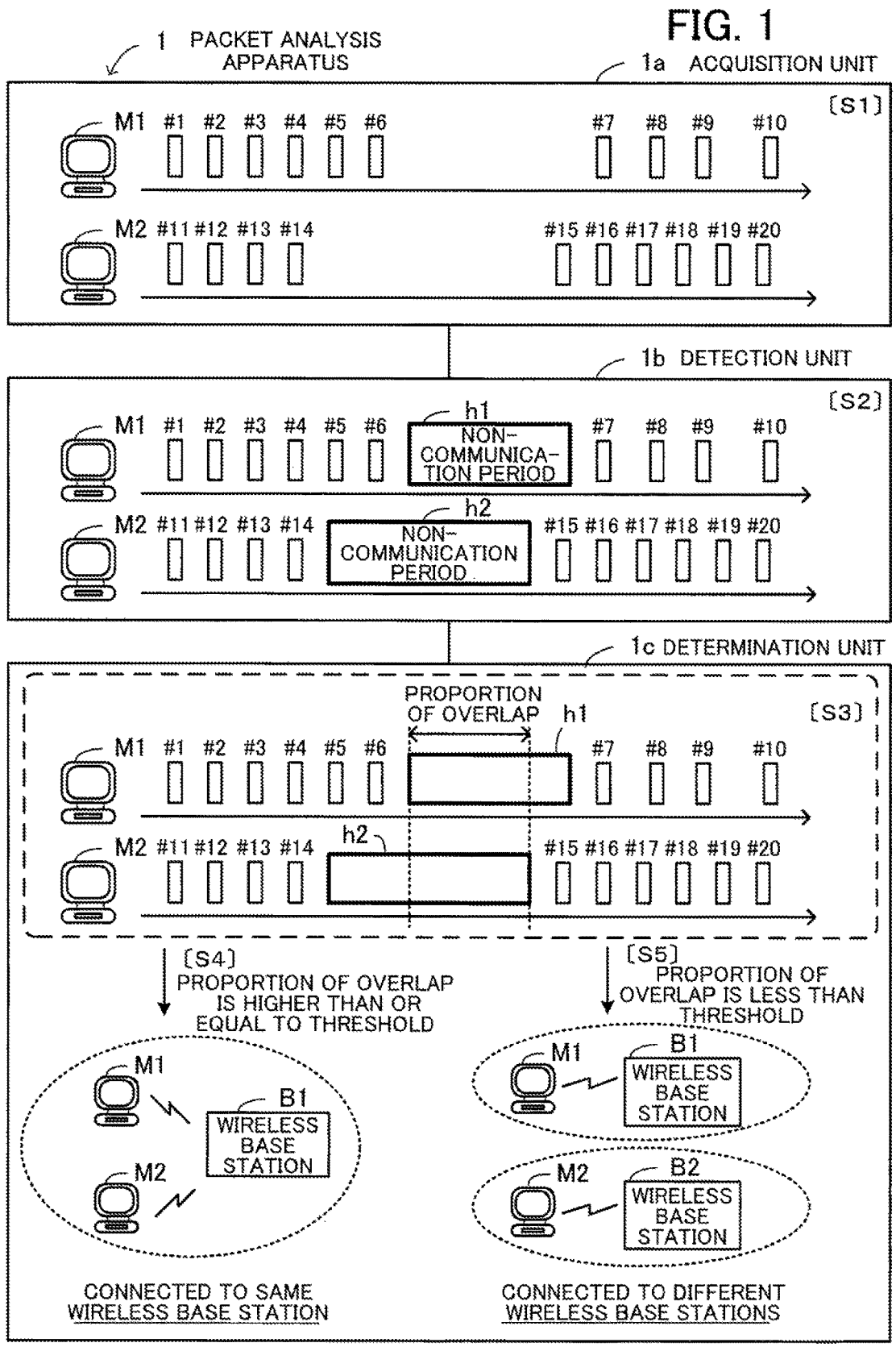
FIG. 1 illustrates an example of functions of a packet analysis apparatus according to a first embodiment.

Several embodiments will be described below with reference to the accompanying drawings, wherein like reference numerals refer to like elements throughout. It is noted that one or more of the embodiments may be combined as long as the combined embodiments are not mutually exclusive.

First Embodiment

The following describes a first embodiment. FIG. 1 illustrates an example of functions of a packet analysis apparatus according to the first embodiment. A network is configured with a combination of wired and wireless networks, and the illustrated packet analysis apparatus 1 is provided on the wired network, for example. In the following description, the wireless network area of the network is referred to as a wireless section, and the wired network area is referred to as a wired section. The packet analysis apparatus 1 captures packets in the wired section and analyzes the communication state of the network.

The packet analysis apparatus 1 includes an acquisition unit 1a, a detection unit 1b, and a determination unit 1c. The functions of these units are implemented by using a processor, for example.

The acquisition unit 1a captures packets passing through a monitoring point in the wired section, for example, in order to obtain packet groups transmitted by a plurality of wireless communication apparatuses M1 and M2. For example, the acquisition unit 1a obtains a packet group (packets #1 to #10) that has been transmitted wirelessly by the wireless communication apparatus M1 and is to be received by any one of a plurality of wireless base stations B1 and B2 connected to the wired section. Likewise, the acquisition unit 1a obtains a packet group (packets #11 to #20) that has been transmitted wirelessly by the wireless communication apparatus M2 and is to be received by any one of the plurality of wireless base stations B1 and B2 connected to the wired section.

The detection unit 1b detects non-communication periods h1 and h2 during which there are no packets transmitted by the wireless communication apparatuses M1 and M2 for a prescribed time or longer, on the basis of the obtained packet groups. For example, the detection unit 1b detects the non-communication period h1 during which there are no packets transmitted by the wireless communication apparatus M1 for a prescribed time or longer, on the basis of the captured times of the packets #1 to #10 transmitted by the wireless communication apparatus M1. Likewise, the detection unit 1b detects the non-communication period h2 during which there are no packets transmitted by the wireless communication apparatus M2 for the prescribed time or longer, on the basis of the captured times of the packets #11 to #20 transmitted by the wireless communication apparatus M2.

The captured time of each packet is the timestamp of the packet being captured, for example. Then, for example, the detection unit 1b arranges the packets of the packet group transmitted by the transmission-source wireless communication apparatus M1 in chronological order based on the captured times. If the captured times of two consecutive packets have a difference (a consecutive-packet reception interval) greater than or equal to a threshold, the detection unit 1b takes a time period from the captured time of the earlier-captured packet to the captured time of the later-captured packet as the non-communication period h1 of the wireless communication apparatus M1.

For example, the threshold for the consecutive-packet reception intervals, which is used for detecting the non-communication periods h1 and h2, is set such that periods during which the wireless base stations B1 and B2 transmit beacons or other frames are detected as non-communication periods h1 and h2 of the wireless communication apparatuses M1 and M2 connected to the wireless base stations B1 and B2. For example, assuming that it takes 12 ms for the wireless base stations B1 and B2 to transmit a 1500-byte frame at 1 Mbps, the threshold for the consecutive-packet reception intervals is set to 10 ms. By doing so, a period during which the wireless base station B1, B2 transmits beacons or other frames is included in the non-communication period h1, h2 of the wireless communication apparatus M1, M2 connected to the wireless base station B1, B2.

The determination unit 1c determines based on an overlap of the non-communication periods h1 and h2 of the wireless communication apparatuses M1 and M2 whether these wireless communication apparatuses M1 and M2 are connected to the same wireless base station (B1 or B2). For example, the determination unit 1c determines based on a proportion of overlap between the non-communication period h1, h2 of one wireless communication apparatus M1, M2 and the non-communication period h1, h2 of the other wireless communication apparatus M1, M2 whether these two wireless communication apparatuses M1 and M2 are connected to the same wireless base station (B1 or B2). The proportion of overlap between the non-communication periods h1 and h2 of the two wireless communication apparatuses M1 and M2 is, for example, the overlap proportion of the non-communication period h1, h2 of one wireless communication apparatus M1, M2 in the non-communication period h1, h2 of the other wireless communication apparatus M1, M2. If the calculated proportion is higher than or equal to a threshold, the determination unit 1c determines that the two wireless communication apparatuses M1 and M2 are connected to the same wireless base station (B1 or B2).

The following describes an operational flow with reference to a concrete example illustrated in FIG. 1.

(Step S1) It is assumed that the wireless communication apparatus M1 transmits packets #1 to #10 to a wireless base station in a wireless connection between the wireless communication apparatus M1 and the wireless base station. The acquisition unit 1a obtains a packet group including the packets #1 to #10 transmitted by the wireless communication apparatus M1.

In addition, it is assumed that the wireless communication apparatus M2 transmits packets #11 to #20 to a wireless base station in a wireless connection between the wireless communication apparatus M2 and the wireless base station. The acquisition unit 1a obtains a packet group including the packets #11 to #20 transmitted by the wireless communication apparatus M2.

(Step S2) The detection unit 1b detects the non-communication period h1 during which the wireless communication apparatus M1 is not under communication, on the basis of the packet group transmitted by the wireless communication apparatus M1. Likewise, the detection unit 1b detects the non-communication period h2 during which the wireless communication apparatus M2 is not under communication, on the basis of the packet group transmitted by the wireless communication apparatus M2.

(Step S3) The determination unit 1c calculates the proportion of overlap between the non-communication period h1 of the wireless communication apparatus M1 and the non-communication period h2 of the wireless communication apparatus M2. The determination unit 1c then compares the proportion of overlap with a threshold.

(Step S4) If the proportion of overlap is higher than or equal to the threshold, the determination unit 1c determines that the wireless communication apparatuses M1 and M2 are connected to the same wireless base station (B1 or B2). For example, as illustrated in FIG. 1, the wireless communication apparatuses M1 and M2 are connected to the same wireless base station B1.

(Step S5) If the proportion of overlap is lower than the threshold, the determination unit 1c determines that the wireless communication apparatuses M1 and M2 are not connected to the same wireless base station (B1 or B2) but are connected to different wireless base stations. For example, as illustrated in FIG. 1, the wireless communication apparatus M1 is connected to the wireless base station B1, whereas the wireless communication apparatus M2 is connected to the wireless base station B2.

In the way described above, the packet analysis apparatus 1 determines, based on the non-communication periods h1 and h2 occurring in packet groups obtained in the wired section of the network, whether a plurality of wireless communication apparatuses are connected to the same wireless base station (B1 or B2). Such monitoring of packets in the wired section makes it possible to detect whether a plurality of wireless communication apparatuses M1 and M2 are connected to the same wireless base station (B1 or B2).

This determination is made using the features of the wireless base stations B1 and B2. More specifically, the wireless base stations B1 and B2 each have periods during which the wireless base station B1, B2 does not allow any wireless terminal apparatuses connected thereto to perform communication. For example, the wireless base stations B1 and B2 each periodically transmit a signal called a beacon to inform the wireless terminal apparatuses of the existence of the own wireless base stations B1 and B2. While the wireless base stations B1 and B2 each transmit the beacons, any wireless terminal apparatuses connected thereto are not able to perform communication. In view of this, a period during which the wireless base station B1, B2 transmits the beacon is considered as a non-communication period h1, h2 of the plurality of wireless terminal apparatuses connected to the wireless base station B1, B2. Therefore, a plurality of wireless terminal apparatuses connected to the same wireless base station (B1 or B2) have a higher proportion of overlap between the non-communication periods h1 and h2. This means that a plurality of wireless terminal apparatuses with a higher proportion of overlap between the non-communication periods h1 and h2 are probably connected to the same wireless base station (B1 or B2).

Since it is possible to determine whether a plurality of wireless communication apparatuses M1 and M2 are connected to the same wireless base station (B1 or B2), it is easy to locate a point that is the cause of deterioration of communication quality.

For example, assume that it is detected that, with respect to the wireless communication apparatuses M1 and M2, their communication quality is deteriorated and the wireless communication apparatuses M1 and M2 are connected to the wireless base station B1.

In this case, it is determined that, not the wireless communication apparatuses M1 and M2 but the wireless base station B1 is probably the cause of the deterioration since both of the wireless communication apparatuses M1 and M2 connected to the wireless base station B1 have deteriorated in communication quality. The cases where the wireless base station B1 is the cause of the deterioration include the case where the wireless base station B1 itself is the cause of the deterioration and the case where another part related to the wireless base station B1 is the cause of the deterioration. For example, the case where something is wrong with the wired section to which the wireless base station B1 is connected is considered as the case where the wireless base station B1 is the cause of the deterioration.

As another example, assume that it is detected that the communication quality of the wireless communication apparatus M1 of the wireless communication apparatuses M1 and M2 is deteriorated and the wireless communication apparatuses M1 and M2 are connected to the same wireless base station B1.

In this case, since only the wireless communication apparatus M1 out of the wireless communication apparatuses M1 and M2 connected to the same wireless base station B1 has deteriorated in communication quality, it is determined that not the wireless base station B1 but the wireless communication apparatus M1 is probably the cause of the deterioration.

In the case where the above functions of the packet analysis apparatus 1 find the deterioration in the quality of the wireless communication, the above approach makes it easy to clarify which is the cause of the deterioration, a wireless communication apparatus or any part (for example, wireless base station B1, B2) other than the wireless communication apparatus.

In this connection, it is also possible to determine whether wireless communication apparatuses are connected to the same wireless base station (B1 or B2), on the basis of the captured times of packets before or after the overlap period of the non-communication periods h1 and h2. For example, if the non-communication periods h1 and h2 have an overlap period, the determination unit 1c calculates a difference between the captured time of the packet #7 captured immediately after the non-communication period h1 and the captured time of the packet #15 captured immediately after the non-communication period h2, and takes the calculated difference as a packet interval. If the packet interval is less than or equal to a threshold, the determination unit 1c determines that the wireless communication apparatuses M1 and M2 are connected to the same wireless base station (B1 or B2). If the packet interval exceeds the threshold, the determination unit 1c determines that the wireless communication apparatuses M1 and M2 are connected to the different wireless base stations B1 and B2.

This determination is made using the feature that, after a period during which the wireless base station B1, B2 stops the wireless communication apparatuses M1 and M2 from transmitting packets ends, the wireless communication apparatuses M1 and M2 connected to the wireless base station B1, B2 start the packet transmission with a little time difference. For example, while the wireless base station B1 transmits beacons to the wireless communication apparatuses M1 and M2 connected thereto, neither of the wireless communication apparatuses M1 and M2 is allowed to transmit packets. Then, after the wireless base station B1 ends the transmission of the beacons, the wireless communication apparatuses M1 and M2 are sequentially allotted bandwidths by the wireless base station B1 and start the packet transmission. Thus, the transmission times of packets transmitted first after the non-communication periods h1 and h2 have no large difference. If a difference between the captured time of a packet transmitted from the wireless communication apparatus M1 and the captured time of a packet transmitted from the wireless communication apparatus M2 immediately after the overlap period of the non-communication periods h1 and h2 is less than or equal to the threshold, the wireless communication apparatuses M1 and M2 are determined to be connected to the same wireless base station B1.

Similarly, consider the case where the wireless communication apparatuses M1 and M2 are connected to the wireless base station B1. When the wireless base station B1 starts to transmit beacons, the wireless communication apparatuses M1 and M2 become unable to transmit packets at the same time. Therefore, by taking, as a packet interval, a difference between the captured times of packets captured immediately before the non-communication periods h1 and h2, it is determined accurately whether the wireless communication apparatuses M1 and M2 are connected to the same wireless base station B1.

In this connection, by making the determination while the wireless communication apparatuses M1 and M2 both keep on transmitting packets, the determination unit 1c is able to obtain the determination result more accurately. In other words, if one of the wireless communication apparatuses M1 and M2 does not perform packet transmission, the determination unit 1c does not make the determination, in order to avoid an erroneous determination result.

For example, if the number of packets in a packet group obtained during a fixed collection period is less than a prescribed value, the determination unit 1c excludes the collection period as an analysis period. In addition, if the number of non-communication periods h1 and h2 detected in the fixed collection period is less than a prescribed value, the determination unit 1c may exclude the collection period as the analysis period. This makes it possible to avoid an erroneous determination result.

In this connection, the acquisition unit 1a, detection unit 1b, and determination unit 1c may be implemented by using a processor provided in the packet analysis apparatus 1, for example.

Second Embodiment

The following describes a second embodiment. In the second embodiment, packets are captured in a wired section of a system where a wireless LAN is constructed, and it is determined based on non-communication periods occurring in the packet groups whether a plurality of wireless communication apparatuses are connected to the same wireless base station. In the following, wireless communication apparatuses are referred to as wireless LAN terminals, and wireless base stations are referred to as access points (AP).

Figure 2:
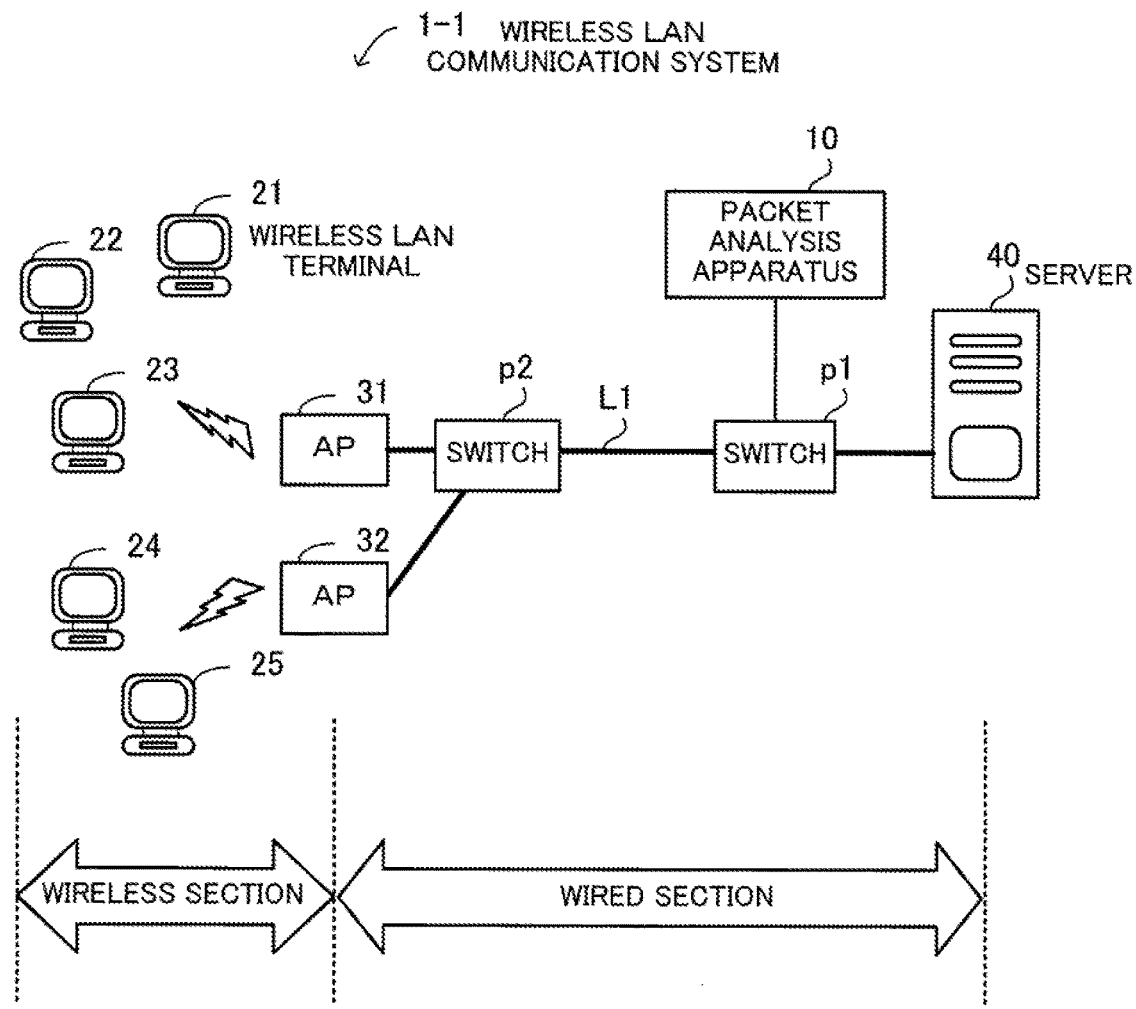
FIG. 2 illustrates an example of a configuration of a wireless LAN communication system.

FIG. 2 illustrates an example of a configuration of a wireless LAN communication system. The illustrated wireless LAN communication system 1-1 includes wireless LAN terminals 21 to 25, access points 31 and 32, a packet analysis apparatus 10, and a server 40. The communication area of the wireless LAN communication system 1-1 is divided into a wired section and a wireless section.

In the wired section, the server 40 is installed at the end of a wired connection L1, and a switch (or a tap) p1 and a switch p2, which are splitter devices, are provided on the wired connection L1. In addition, the packet analysis apparatus 10 is connected via the switch p1, and the access points 31 and 32 are connected via the switch p2.

In addition, referring to the example of FIG. 2, in the wireless section, the wireless LAN terminals 21 to 23 are connected to the access point 31, and the wireless LAN terminals 24 and 25 are connected to the access point 32.

The packet analysis apparatus 10 analyzes the communication state of the wireless LAN to manage the communication quality of the wireless LAN. In this case, the packet analysis apparatus 10 captures packets in the wired section of the system, that is, captures packets passing through the wired connection L1 via the switch p1. The packet analysis apparatus 10 then analyzes the communication state of the wireless LAN.

Figure 3:
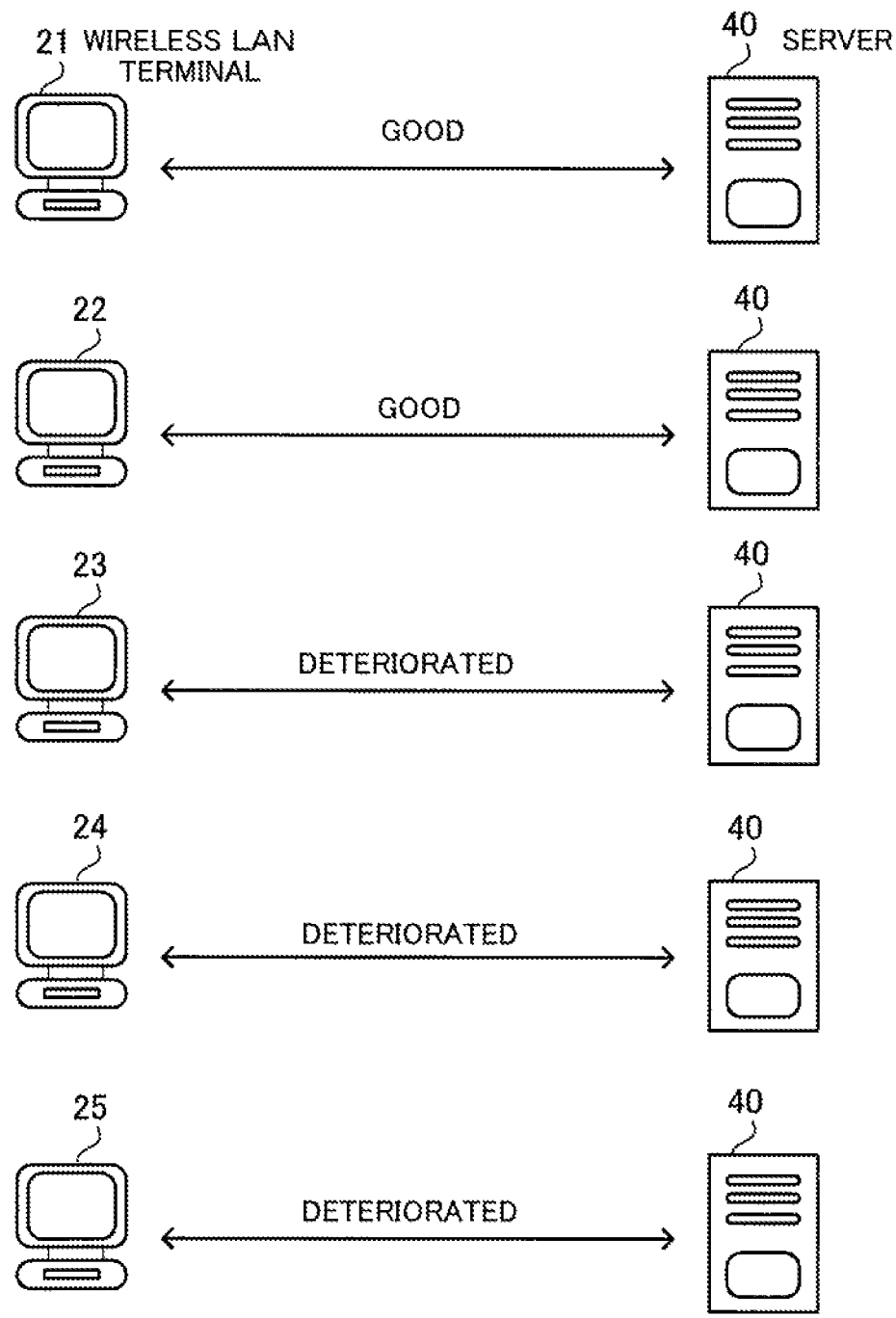
FIG. 3 illustrates an example of results of analyzing communication states.

FIG. 3 illustrates an example of results of analyzing communication states. The packet analysis apparatus 10 is able to capture packets in the wired section and analyze the communication state between each wireless LAN terminal 21 to 25 and the server 40.

Referring to the example of FIG. 3, the packet analysis apparatus 10 recognizes that the communication quality between the wireless LAN terminal 21 and the server 40 is good and the communication quality between the wireless LAN terminal 22 and the server 40 is good.

In addition, the packet analysis apparatus 10 recognizes that the communication quality between the wireless LAN terminal 23 and the server 40 is deteriorated, the communication quality between the wireless LAN terminal 24 and the server 40 is deteriorated, and the communication quality between the wireless LAN terminal 25 and the server 40 is deteriorated.

It is noted that packets passing through the wired connection L1 do not carry any information about which access point the transmitting wireless LAN terminal is connected to. Therefore, in conventional techniques, it is difficult to analyze, with respect to each access point, the communication state between each wireless LAN terminal and the access point.

That is, even if deteriorated communication quality between a wireless LAN terminal and a server is detected, as illustrated in the example of FIG. 3, it is difficult to clarify which is the cause of the deterioration in the communication quality, the wireless LAN terminal or the access point.

In this connection, it may be considered that the packet analysis apparatus obtains, from each access point, information about communication between a wireless LAN terminal and the access point, and analyzes the communication state of the wireless LAN. However, to obtain the information about communication from the access point, the packet analysis apparatus needs to make an inquiry to an administrator of the access point, log in to the access point, issue a command, and execute other operations. Therefore, it is not simple to obtain the information.

To address this, the second embodiment is designed to obtain packet groups in a wired section of a system where a wireless LAN is constructed and to determine based on non-communication periods occurring in the packet flows of the packet groups whether a plurality of wireless communication apparatuses are connected to the same wireless base station.

In this approach, if deterioration of the communication quality is detected, it is possible to locate which is the cause of the deterioration, the wireless LAN terminal or the access point.

Figure 4:
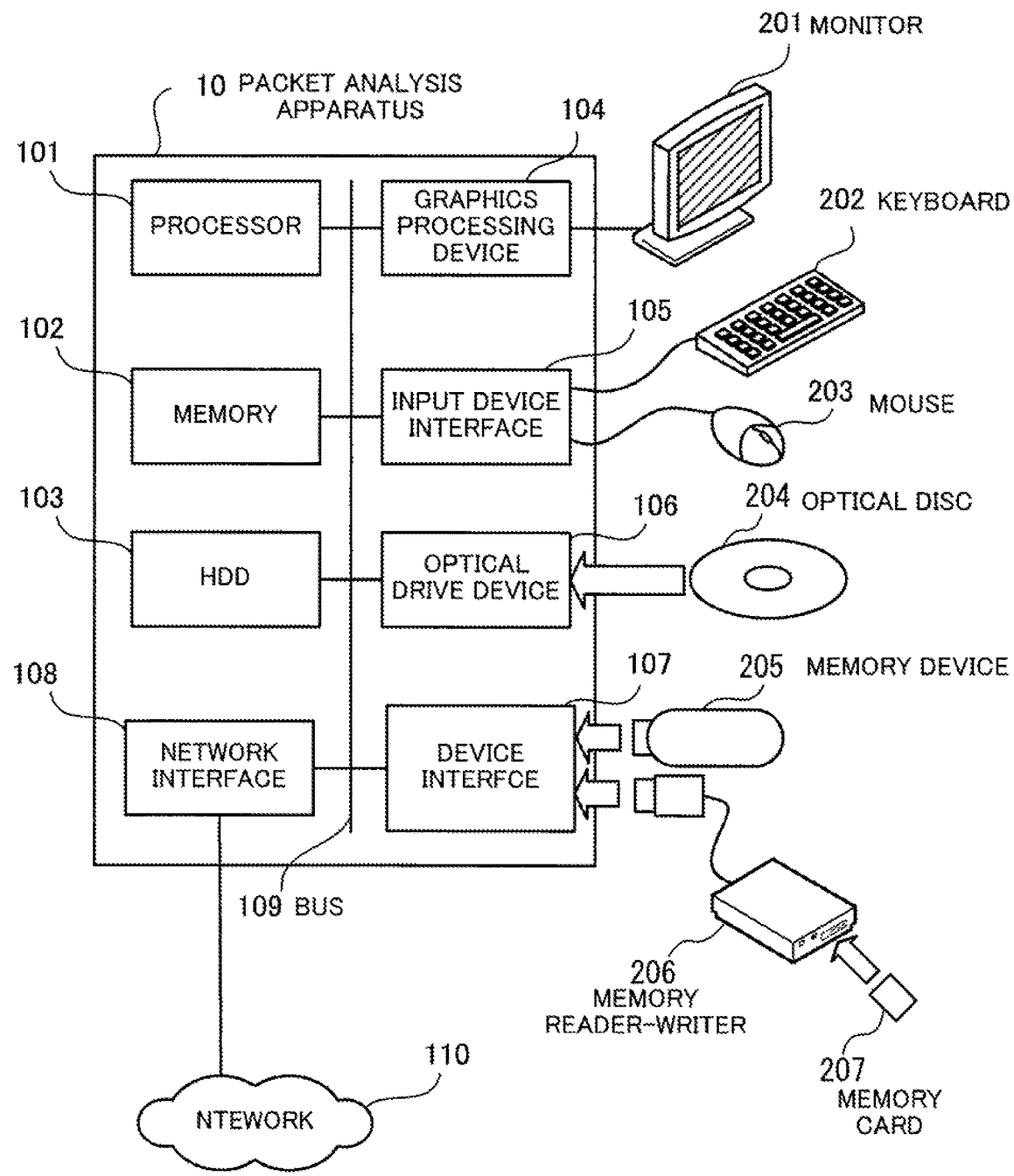
FIG. 4 illustrates an example of a hardware configuration of a packet analysis apparatus according to a second embodiment.

FIG. 4 illustrates an example of a hardware configuration of the packet analysis apparatus according to the second embodiment. The packet analysis apparatus 10 is entirely controlled by a processor 101. A memory 102 and a plurality of peripherals are connected to the processor 101 with a bus 109. The processor 101 may be a multiprocessor.

The processor 101 may be a Central Processing Unit (CPU), a Micro Processing Unit (MPU), or a Digital Signal Processor (DSP), for example. At least part of functions of the processor 101 may be implemented by using Application Specific Integrated Circuit (ASIC), Programmable Logic Device (PLD), or other electronic circuits.

The memory 102 is a primary storage device of the packet analysis apparatus 10. The memory 102 temporarily stores therein at least part of Operating System (OS) programs and application programs that are executed by the processor 101. In addition, the memory 102 stores therein various data that is used by the processor 101 in processing. For example, as the memory 102, a Random Access Memory (RAM) or another volatile semiconductor storage device may be used.

The peripherals connected to the bus 109 include a Hard Disk Drive (HDD) 103, a graphics processing device 104, an input device interface 105, an optical drive device 106, a device interface 107, and a network interface 108.

The HDD 103 magnetically writes and reads data to and from a built-in disk. The HDD 103 is used as an auxiliary storage device of the packet analysis apparatus 10. The HDD 103 stores therein OS programs, application programs, and various data. In this connection, as the auxiliary storage device, a flash memory or another non-volatile semiconductor device may be used.

A monitor 201 is connected to the graphics processing device 104. The graphics processing device 104 displays images on the monitor 201 in accordance with instructions from the processor 101. As the monitor 201, a Cathode Ray Tube (CRT) display device, a liquid crystal display device, or another may be used.

A keyboard 202 and a mouse 203 are connected to the input device interface 105. The input device interface 105 gives signals received from the keyboard 202 and mouse 203 to the processor 101.

In this connection, the mouse 203 is an example of pointing devices. Another pointing device may be used. Other pointing devices include touch panels, tablets, touch pads, track balls, and others.

The optical drive device 106 reads data from an optical disc 204 with laser light or others. The optical disc 204 is a portable recording medium on which data is recorded so as to be readable with reflection of light. As the optical disc 204, a Digital Versatile Disc (DVD), DVD-RAM, Compact Disc Read Only Memory (CD-ROM), CD-R (Recordable), CD-RW (ReWritable), or another may be used.

The device interface 107 is a communication interface for connecting peripherals to the packet analysis apparatus 10. For example, a memory device 205 or a memory reader-writer 206 may be connected to the device interface 107. The memory device 205 is a recording medium that has a function of communicating with the device interface 107. The memory reader-writer 206 writes and reads data to and from a memory card 207 that is a card recording medium.

The network interface 108 is connected to a network 110 (including a wireless LAN). The network interface 108 communicates data with another computer or communication device over the network 110.

With the above hardware configuration, the processing functions of the second embodiment may be implemented. In this connection, the packet analysis apparatus 1 of the first embodiment may be implemented with the same hardware as the packet analysis apparatus 10 illustrated in FIG. 4.

The packet analysis apparatus 10 executes a program recorded on a computer-readable recording medium to implement the processing functions of the second embodiment, for example. The program describing the content of processing that is executed by the packet analysis apparatus 10 may be recorded on various recording media.

For example, a program that is executed by the packet analysis apparatus 10 may be stored on the HDD 103. The processor 101 loads at least part of the program from the HDD 103 to the memory 102 and executes the program. In addition, the program that is executed by the packet analysis apparatus 10 may be recorded on a portable recording medium, such as the optical disc 204, memory device 205, or memory card 207.

For example, under the control of the processor 101, the program stored in the portable recording medium is installed on the HDD 103 so as to be executable. Alternatively, the processor 101 may read the program directly from the portable recording medium and execute the program.

Figure 5:
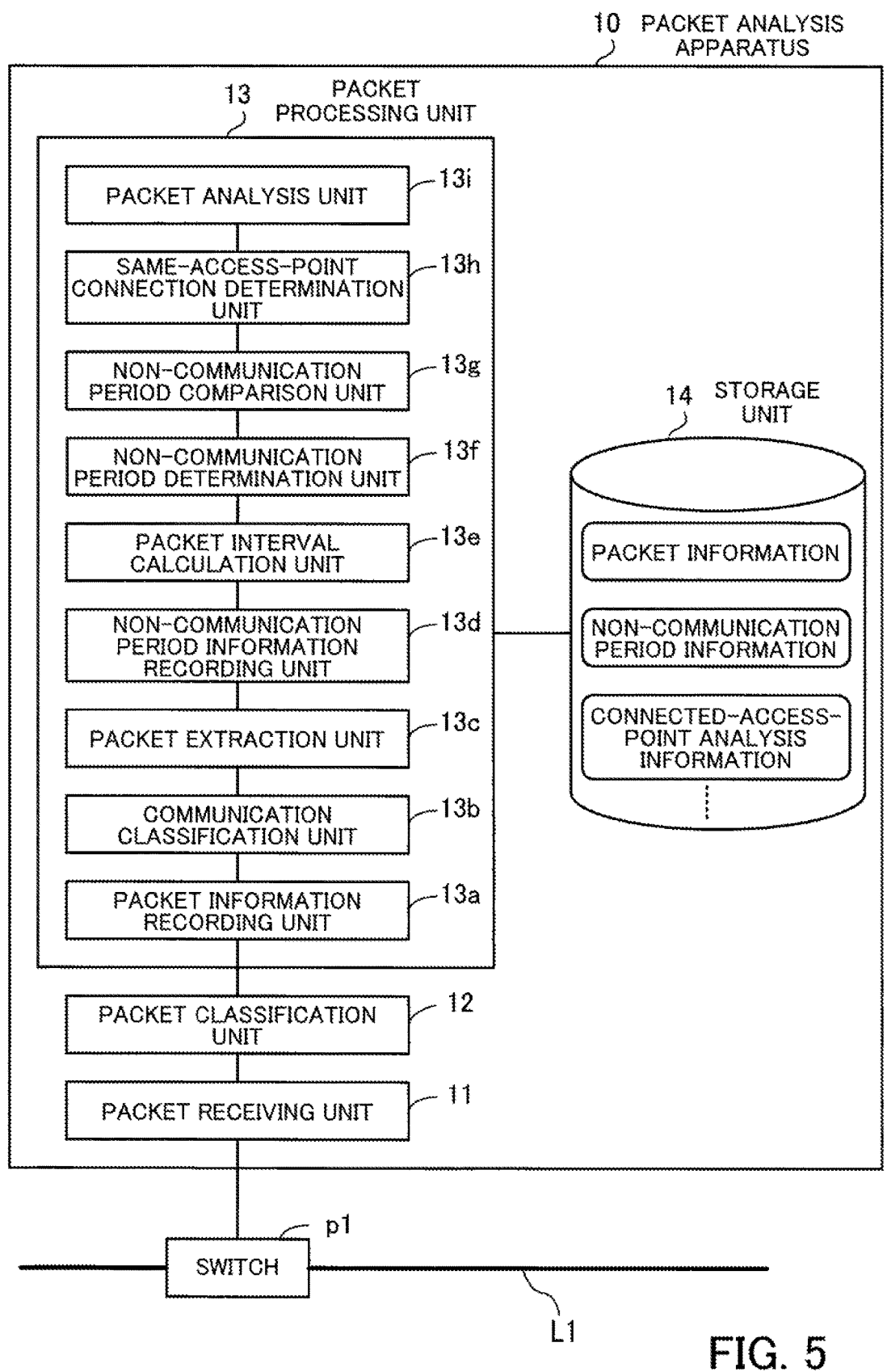
FIG. 5 is a block diagram illustrating an example of functions of the packet analysis apparatus according to the second embodiment.

FIG. 5 is a block diagram illustrating an example of functions of the packet analysis apparatus according to the second embodiment. The packet analysis apparatus 10 includes a packet receiving unit 11, a packet classification unit 12, a packet processing unit 13, and a storage unit 14.

The packet processing unit 13 includes a packet information recording unit 13a, a communication classification unit 13b, a packet extraction unit 13c, a non-communication period information recording unit 13d, a packet interval calculation unit 13e, a non-communication period determination unit 13f, a non-communication period comparison unit 13g, a same-access-point connection determination unit 13h, and a packet analysis unit 13i.

The functions of these constitutional units are implemented by using the processor 101 illustrated in FIG. 4. The storage unit 14 corresponds to the memory 102 and HDD 103 illustrated in FIG. 4. In this connection, these constitutional units may be configured with hardware circuits including logical circuits or the like.

In addition, the functions of the acquisition unit 1a of FIG. 1 are implemented by the packet receiving unit 11 and packet classification unit 12, and the functions of the detection unit 1b and determination unit 1c of FIG. 1 are implemented by the packet processing unit 13.

The packet receiving unit 11 receives packets passing through the wired connection L1 via the switch p1. The packet classification unit 12 recognizes the transmission-source IP addresses of the received packets, and classifies the received packets by transmission-source IP address.

The packet information recording unit 13a records the transmission-source IP addresses of the packets as packet information in the storage unit 14. The communication classification unit 13b classifies communication as wireless LAN communication or wired LAN communication on the basis of the transmission-source IP addresses of the wireless LAN terminals.

The packet extraction unit 13c extracts packets from wireless LAN communication. The non-communication period information recording unit 13d records non-communication period information about the extracted packets to be analyzed, in the storage unit 14.

The packet interval calculation unit 13e calculates a packet interval between a previous packet extracted last time and a packet currently extracted. The non-communication period determination unit 13f compares the calculated packet interval with a threshold to determine whether the calculated packet interval is a non-communication period. The threshold here is used for determining a packet interval as a non-communication period.

The non-communication period comparison unit 13g compares a non-communication period of a wireless LAN connection in question with a non-communication period of another wireless LAN connection, and records the comparison result as connected-access-point analysis information in the storage unit 14.

The same-access-point connection determination unit 13h determines, based on packets collected during a preset collection period and comparison results obtained by the non-communication period comparison unit 13g, whether a plurality of wireless LAN terminals are connected to the same access point. Then, the same-access-point connection determination unit 13h stores the determination result as the connected-access-point analysis information in the storage unit 14.

The packet analysis unit 13i analyzes the communication state between each wireless LAN terminal and the server. When detecting deterioration in communication quality, the packet analysis unit 13i locates a point that is the cause of the deterioration of the communication quality.

The storage unit 14 stores therein the above-described packet information, non-communication period information, and connected-access-point analysis information. In addition to these kinds of information, the storage unit 14 stores therein various parameters that are used by the constitutional units and information that is used for entirely controlling the packet analysis apparatus 10.

The following describes how the packet analysis apparatus 10 performs the same-access-point connection determination to determine whether a plurality of wireless LAN terminals are connected to the same access point, on the basis of non-communication periods of wireless LAN terminals.

First, a reason why a non-communication period of a wireless LAN terminal occurs on a wireless LAN will be explained using a representative example. The communications standards over wireless LAN, e.g., Institute of Electrical and Electronics Engineers (IEEE) 802.11a, 802.11b, and 802.11g, employ communications based on Carrier Sense Multiple Access with Collision Avoidance (CSMA/CA).

In CSMA/CA, if, among a plurality of wireless LAN terminals that use the same channel, a wireless LAN terminal that is going to start communication checks whether any other wireless LAN terminal is under communication and if another wireless LAN terminal is under communication, the wireless LAN terminal waits for the other wireless LAN terminal to end the communication. Then, after the wireless LAN terminal confirms that the channel is not in use for a prescribed time or longer, the wireless LAN terminal starts to transmit data. This approach is used to avoid data collision because data collision on the same channel is not detected in the wireless LAN.

As described above, in the wireless LAN, there may be a wireless LAN terminal that is waiting for another wireless LAN terminal currently performing communication to end the communication. Thus, this wireless LAN terminal has a non-communication period.

As another reason, for example, while an access point broadcasts data to its subordinate wireless LAN terminals, the subordinate wireless LAN terminals receiving the broadcasted data have a non-communication period.

The following describes the same-access-point connection determination based on the proportions of overlap (hereinafter, referred to as the overlap proportions) between non-communication periods of two wireless LAN terminals.

Figure 6:
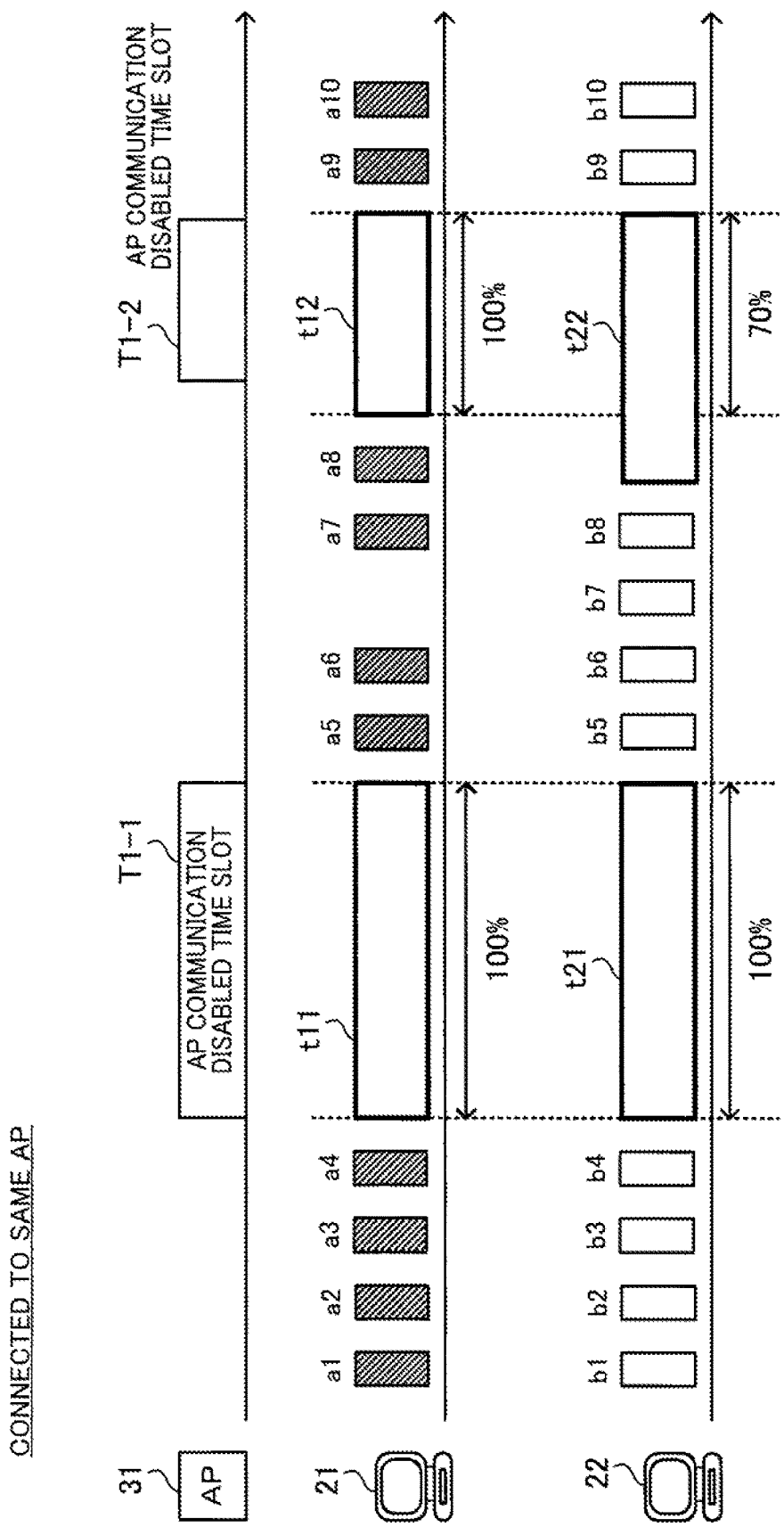
FIGS. 6 and 7 are views for explaining a same-access-point connection determination based on the overlap proportions between non-communication periods.
Figure 7:
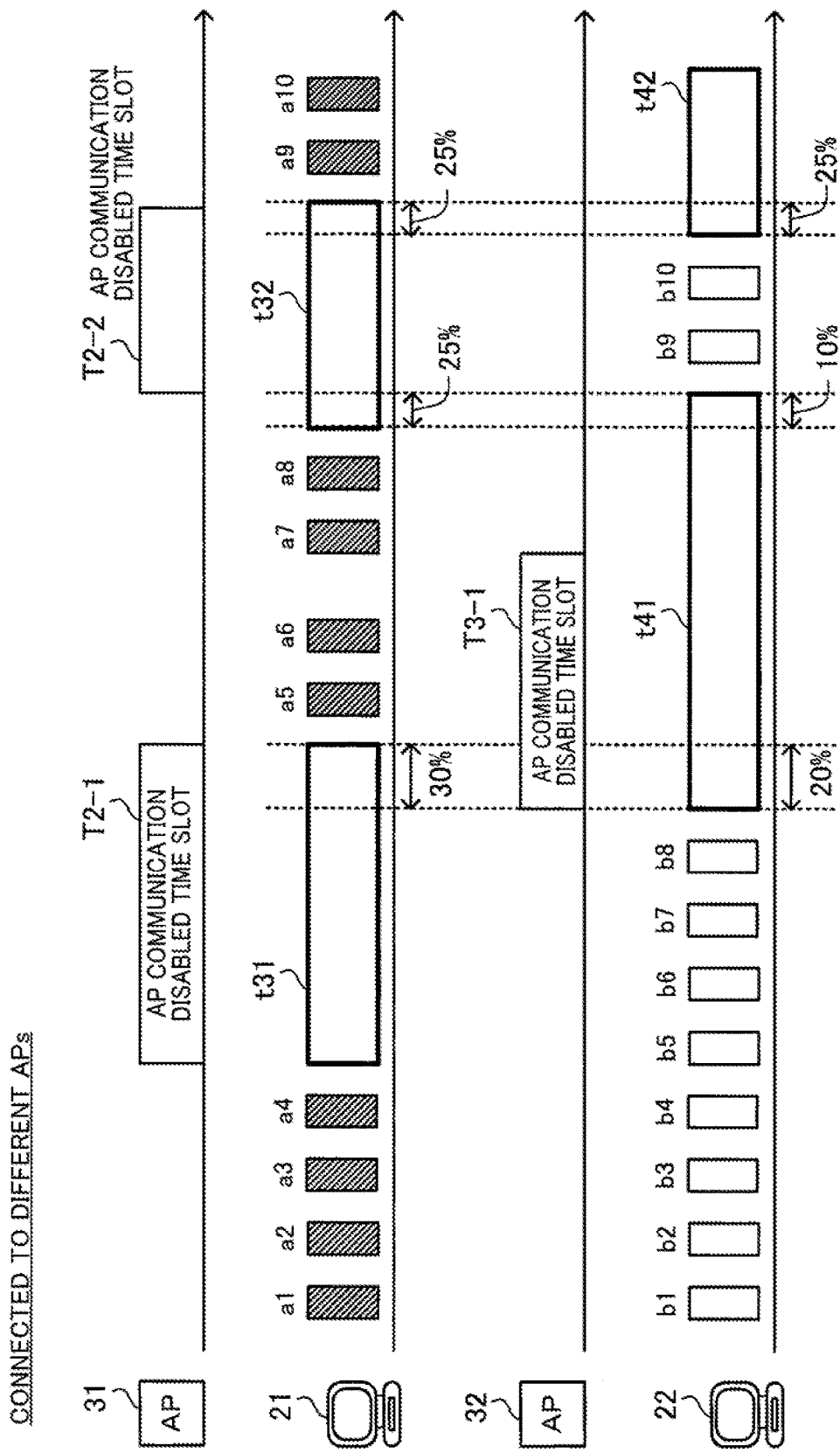

FIGS. 6 and 7 are views for explaining the same-access-point connection determination based on the overlap proportions between non-communication periods. FIG. 6 illustrates the case where the wireless LAN terminals 21 and 22 are connected to the same access point 31, whereas FIG. 7 illustrates the case where the wireless LAN terminals 21 and 22 are connected to different access points 31 and 32.

In the case where a first non-communication period and a second non-communication period overlap, the overlap proportion of the second non-communication period in the first non-communication period is defined by (a common non-communication period of the first and second non-communication periods)÷(first non-communication period). In this connection, the overlap proportion is expressed as a percentage.

Referring to FIG. 6, the wireless LAN terminals 21 and 22 are connected to the access point 31, and there are access point (AP) communication disabled time slots T1-1 and T1-2 during which communication between the access point 31 and the wireless LAN terminals 21 and 22 is disabled.

In the wireless LAN connection between the wireless LAN terminal 21 and the access point 31, the wireless LAN terminal 21 transmits packets a1 to a10 to the access point 31. In addition, while transmitting the packets, the wireless LAN terminal 21 has non-communication periods t11 and t12.

In the wireless LAN connection between the wireless LAN terminal 22 and the access point 31, the wireless LAN terminal 22 transmits packets b1 to b10 to the access point 31. In addition, while transmitting the packets, the wireless LAN terminal 22 has non-communication periods t21 and t22.

Consider the overlap proportions in the individual non-communication periods of each wireless LAN terminal 21, 22. The non-communication period t11 of the wireless LAN terminal 21 and the non-communication period t21 of the wireless LAN terminal 22 are exactly the same, and therefore the overlap proportion in the non-communication period t11 and the overlap proportion in the non-communication period t21 are both 100%.

In addition, the overlap proportion of the non-communication period t22 of the wireless LAN terminal 22 in the non-communication period t12 of the wireless LAN terminal 21 is 100%. Furthermore, the overlap proportion of the non-communication period t12 of the wireless LAN terminal 21 in the non-communication period t22 of the wireless LAN terminal 22 is 70%.

Referring to FIG. 7, the wireless LAN terminal 21 is connected to the access point 31, whereas the wireless LAN terminal 22 is connected to the access point 32. Access point communication disabled time slots T2-1 and T2-2 are time periods during which communication between the access point 31 and the wireless LAN terminal 21 is disabled, and an access point communication disabled time slot T3-1 is a time period during which communication between the access point 32 and the wireless LAN terminal 22 is disabled.

In the wireless LAN connection between the wireless LAN terminal 21 and the access point 31, the wireless LAN terminal 21 transmits packets a1 to a10 to the access point 31. In addition, while transmitting the packets, the wireless LAN terminal 21 has non-communication periods t31 and t32.

In the wireless LAN connection between the wireless LAN terminal 22 and the access point 32, the wireless LAN terminal 22 transmits packets b1 to b10 to the access point 32. In addition, while transmitting the packets, the wireless LAN terminal 22 has non-communication periods t41 and t42.

Consider the overlap proportions in the individual non-communications periods of each wireless LAN terminal 21, 22. The overlap proportion of the non-communication period t41 of the wireless LAN terminal 22 in the non-communication period t31 of the wireless LAN terminal 21 is 30%. Furthermore, the overlap proportion of the non-communication period t31 of the wireless LAN terminal 21 in the non-communication period t41 of the wireless LAN terminal 22 is 20%.

In addition, the overlap proportion of the non-communication period t41 of the wireless LAN terminal 22 in the non-communication period t32 of the wireless LAN terminal 21 is 25%. Furthermore, the overlap proportion of the non-communication period t32 of the wireless LAN terminal 21 in the non-communication period t41 of the wireless LAN terminal 22 is 10%.

In addition, the overlap proportion of the non-communication period t42 of the wireless LAN terminal 22 in the non-communication period t32 of the wireless LAN terminal 21 is 25%. Furthermore, the overlap proportion of the non-communication period t32 of the wireless LAN terminal 21 in the non-communication period t42 of the wireless LAN terminal 22 is 25%.

Considering the above, with respect to the overlap proportion between a non-communication period of one wireless LAN terminal and a non-communication period of the other wireless LAN terminal, the case where these wireless LAN terminals are connected to the same access point has a higher overlap proportion than the case where the wireless LAN terminals are connected to different access points.

Therefore, in the same-access-point connection determination, by setting a threshold for the overlap proportions to 70% in the examples of FIGS. 6 and 7, it is possible to determine that the wireless LAN terminals 21 and 22 are connected to the same access point if the overlap proportions between non-communication periods are higher than or equal to 70%. In addition, it is possible to determine that the wireless LAN terminals 21 and 22 are connected to different access points if the overlap proportions between non-communication periods are lower than 70%.

In the manner described above, the packet analysis apparatus 10 calculates the overlap proportions between the non-communication periods occurring in a packet group transmitted by the wireless LAN terminal 21 and the non-communication periods occurring in a packet group transmitted by the wireless LAN terminal 22, and compares the overlap proportions with the threshold.

The packet analysis apparatus 10 determines that the wireless LAN terminals 21 and 22 are connected to the same access point if the overlap proportions are higher than or equal to the threshold. This approach makes it possible to determine whether the two wireless LAN terminals are connected to the same access point, efficiently with high accuracy.

In this connection, in practice, in the case of performing the same-access-point connection determination by calculating an overlap proportion and comparing the calculated overlap proportion with a threshold, it is preferable to calculate an average of a plurality of overlap proportions and compares the calculated average value with the threshold.

The following describes the same-access-point connection determination based on a packet interval (packet time difference) between a packet before or after a non-communication period of one wireless LAN terminal and a packet before or after a non-communication period of another wireless LAN terminal.

Figure 8:
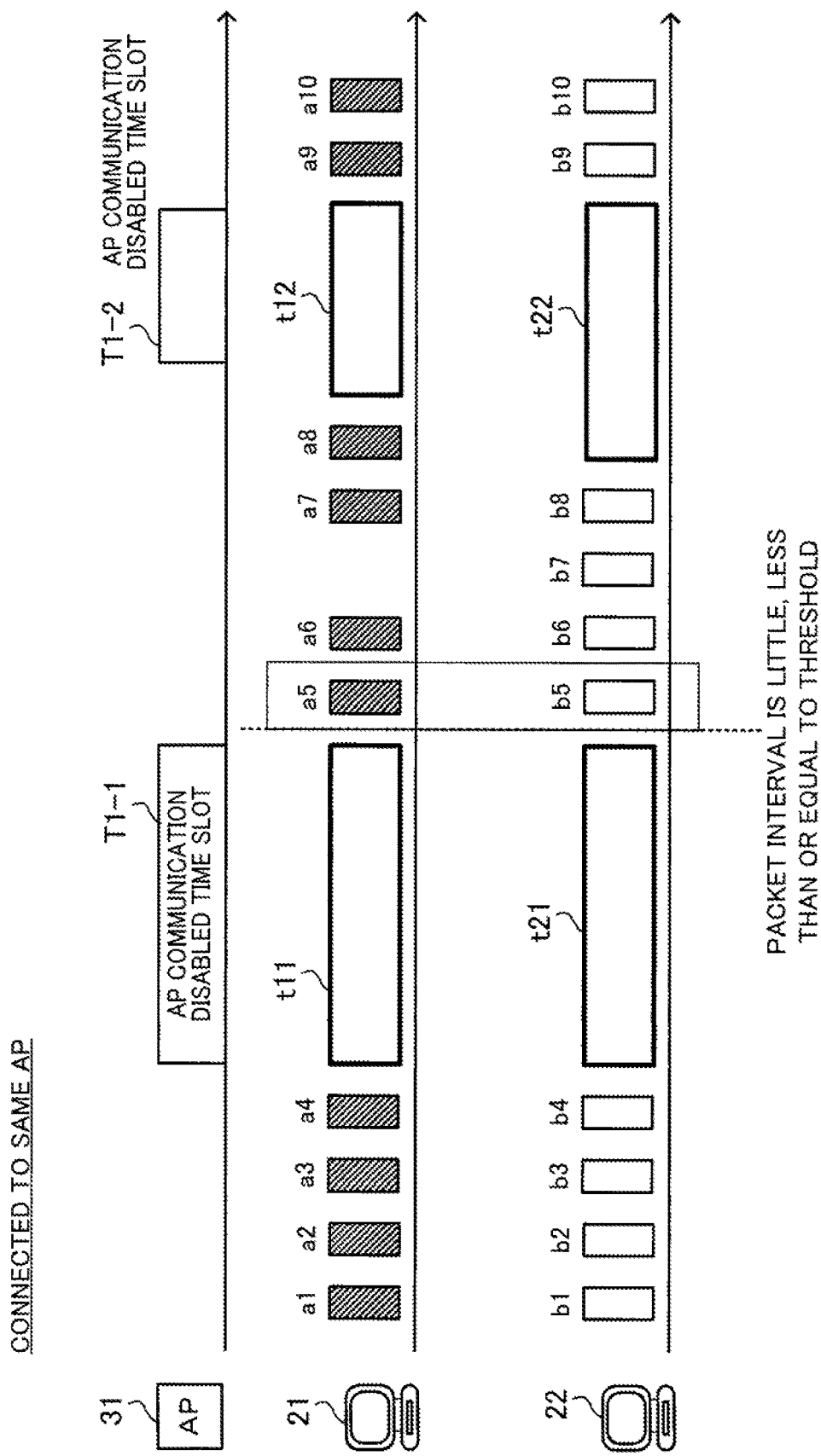
FIGS. 8 and 9 are views for explaining the same-access-point connection determination based on a packet interval between packets captured immediately after non-communication periods.
Figure 9:
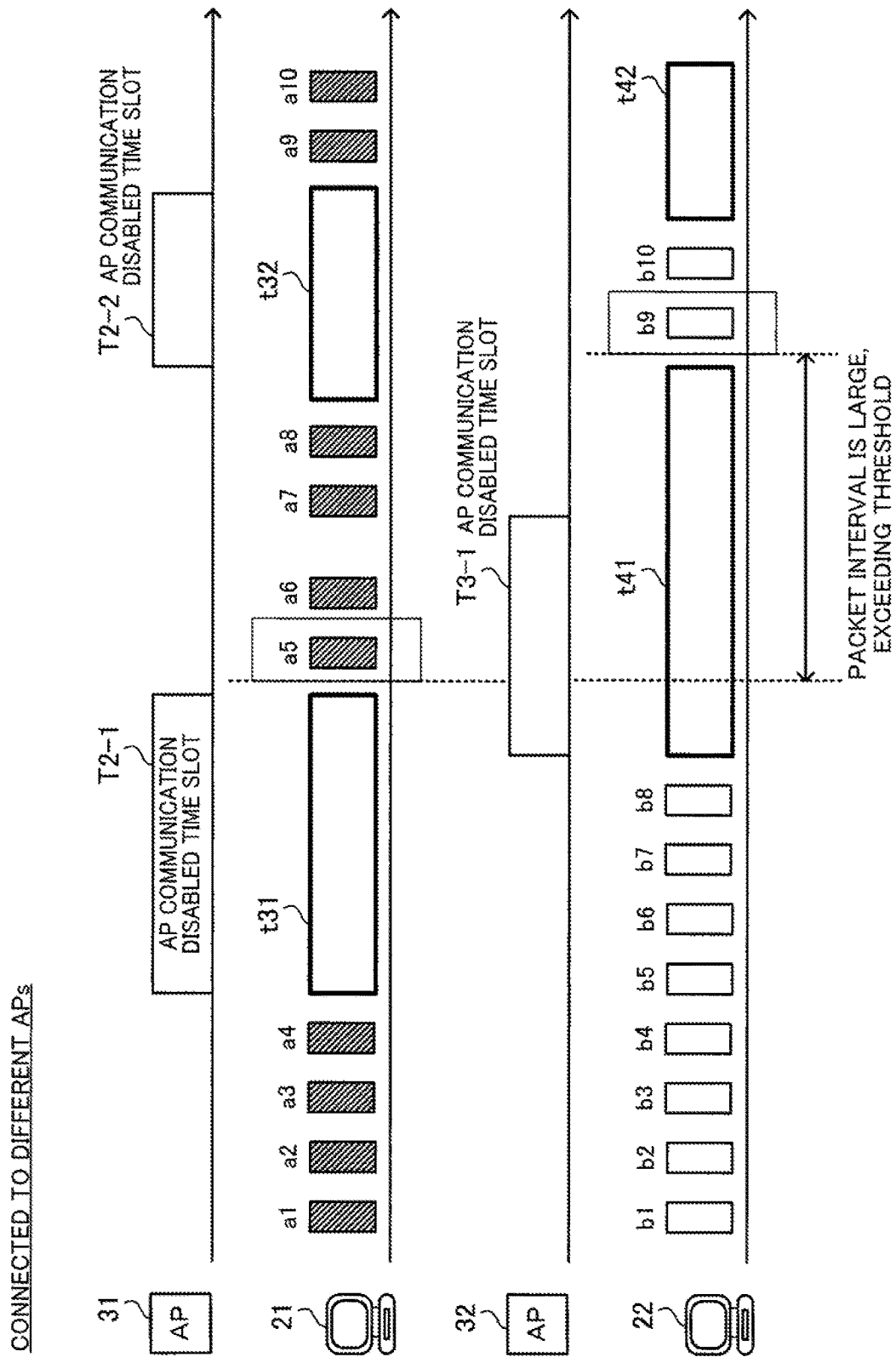

FIGS. 8 and 9 are views for explaining the same-access-point connection determination based on a packet interval between packets captured immediately after non-communication periods. FIG. 8 illustrates the case where the wireless LAN terminals 21 and 22 are connected to the same access point, whereas FIG. 9 illustrates the case where the wireless LAN terminals 21 and 22 are connected to different access points.

Referring to FIG. 8, the wireless LAN terminals 21 and 22 are connected to the access point 31, and there are access point communication disabled time slots T1-1 and T1-2 during which communication between the access point 31 and the wireless LAN terminals 21 and 22 are disabled.

In the wireless LAN connection between the wireless LAN terminal 21 and the access point 31, the wireless LAN terminal 21 transmits packets a1 to a10 to the access point 31. In addition, while transmitting the packets, the wireless LAN terminal 21 has non-communication periods t11 and t12.

In the wireless LAN connection between the wireless LAN terminal 22 and the access point 31, the wireless LAN terminal 22 transmits packets b1 to b10 to the access point 31. In addition, while transmitting the packets, the wireless LAN terminal 22 has non-communication periods t21 and t22.

Consider a packet interval between packets captured immediately after the non-communication periods of the wireless LAN terminals 21 and 22. The packet a5 is captured immediately after the non-communication period t11 of the wireless LAN terminal 21, and the packet b5 is captured immediately after the non-communication period t21 of the wireless LAN terminal 22. Provided that the packet interval between the packets a5 and b5 is less than or equal to a threshold, the packet interval between the packets a5 and b5 is determined to be little.

Referring to FIG. 9, the wireless LAN terminal 21 is connected to the access point 31, whereas the wireless LAN terminal 22 is connected to the access point 32. Access point communication disabled time slots T2-1 and T2-2 are time periods during which communication between the access point 31 and the wireless LAN terminal 21 is disabled, and an access point communication disabled time slot T3-1 is a time period during which communication between the access point 32 and the wireless LAN terminal 22 is disabled.

In the wireless LAN connection between the wireless LAN terminal 21 and the access point 31, the wireless LAN terminal 21 transmits packets a1 to a10 to the access point 31. In addition, while transmitting the packets, the wireless LAN terminal 21 has non-communication periods t31 and t32.

In the wireless LAN connection between the wireless LAN terminal 22 and the access point 32, the wireless LAN terminal 22 transmits packets b1 to b10 to the access point 32. In addition, while transmitting the packets, the wireless LAN terminal 22 has non-communication periods t41 and t42.

Consider a packet interval between packets captured immediately after the non-communication periods of the wireless LAN terminals 21 and 22. The packet a5 is captured immediately after the non-communication period t31 of the wireless LAN terminal 21, and the packet b9 is captured immediately after the non-communication period t41 of the wireless LAN terminal 22. Provided that the packet interval between the packets a5 and b9 exceeds the threshold, the packet interval between the packets a5 and b9 is determined to be large.

In the manner described above, a packet interval between a packet immediately after a non-communication period of one wireless LAN terminal and a packet immediately after a non-communication period of another wireless LAN terminal is obtained. In this case, the case where these wireless LAN terminals are connected to the same access point has a less packet interval than the case where the wireless LAN terminals are connected to different access points.

Therefore, in the same-access-point connection determination, it is possible to determine that the wireless LAN terminals 21 and 22 are connected to the same access point if a packet interval between two packets captured immediately after the non-communication periods of the wireless LAN terminals 21 and 22 is less than or equal to the threshold.

In addition, it is possible to determine that the wireless LAN terminals 21 and 22 are connected to different access points if the packet interval between the two packets captured immediately after the non-communication periods of the wireless LAN terminals 21 and 22 exceeds the threshold.

In this connection, in the examples of FIGS. 8 and 9, it is determined based on a packet interval between two packets captured immediately after non-communication periods whether two wireless LAN terminals are connected to the same access point. Alternatively, a packet interval between two packets captured immediately before non-communication periods may be used to make the determination.

For example, assume now that, in FIG. 8, a packet interval between the packet a4 captured immediately before the non-communication period t11 and the packet b4 captured immediately before the non-communication period t21 is less than or equal to the threshold.

In addition, assume that, in FIG. 9, a packet interval between the packet a4 captured immediately before the non-communication period t31 and the packet b8 captured immediately before the non-communication period t41 exceeds the threshold. In this case, in FIG. 8 where the packet interval is less than or equal to the threshold, the packet analysis apparatus 10 determines that the wireless LAN terminals 21 and 22 are connected to the same access point.

As described above, the packet analysis apparatus 10 calculates a packet interval between a packet captured immediately before or after a non-communication period occurring in a packet group transmitted by the wireless LAN terminal 21 and a packet captured immediately before or after a non-communication period occurring in a packet group transmitted by the wireless LAN terminal 22. Then, the packet analysis apparatus 10 compares the calculated packet interval with the threshold, and determines that the wireless LAN terminals 21 and 22 are connected to the same access point if the calculated packet interval is less than or equal to the threshold. This approach makes it possible to determine whether two wireless LAN terminals are connected to the same access point, efficiently with high accuracy.

In this connection, in practice, in the case of performing the same-access-point connection determination by calculating a packet interval and comparing the calculated packet interval with a threshold, it is preferable to calculate an average of a plurality of packet intervals and compares the calculated average value with the threshold.

Figure 10:
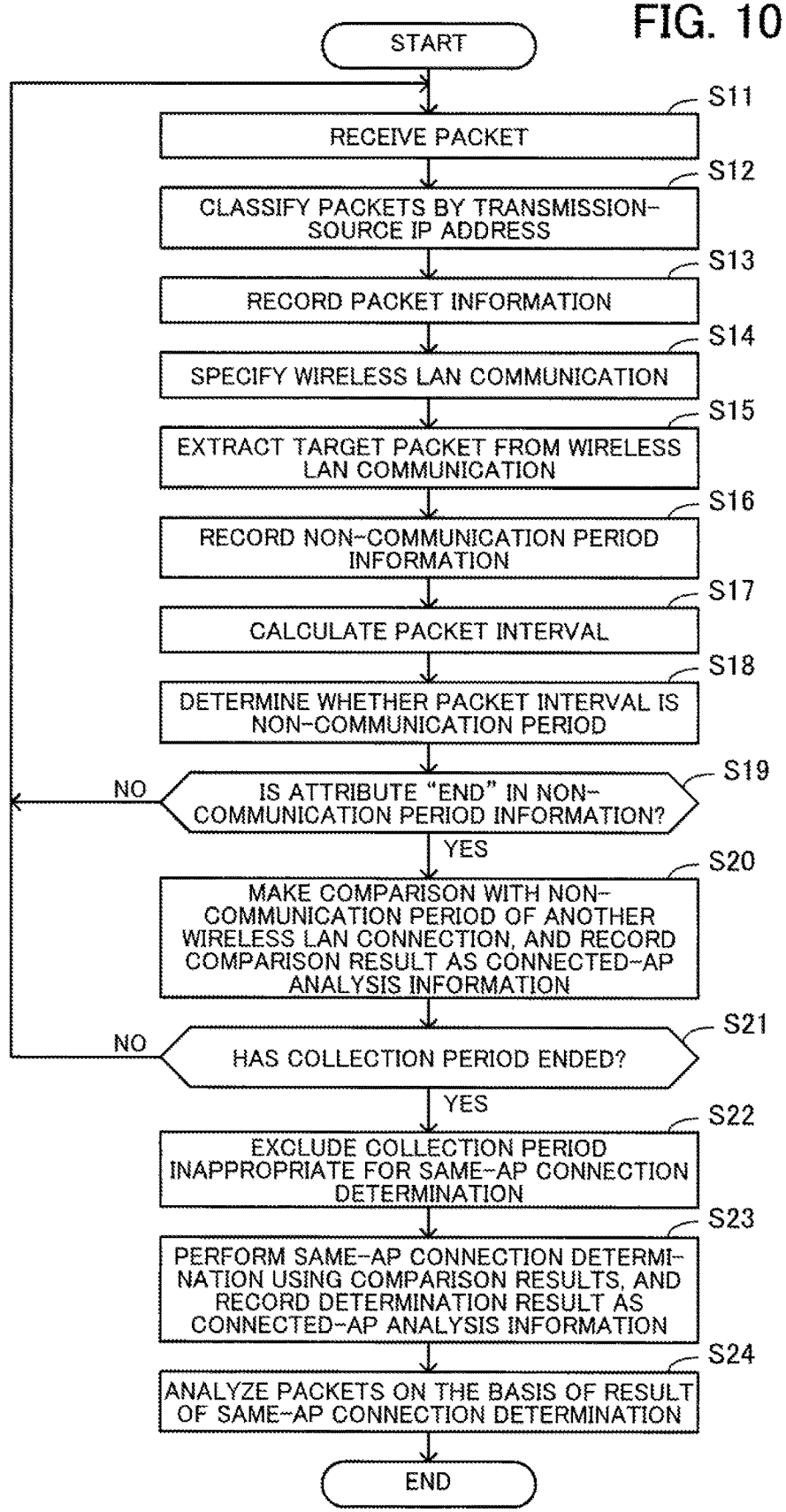
FIG. 10 is a flowchart illustrating an example of an operation of the packet analysis apparatus.

The following describes how the packet analysis apparatus 10 operates, with reference to a flowchart. FIG. 10 is a flowchart illustrating an example of an operation of the packet analysis apparatus.

(Step S11) The packet receiving unit 11 receives a packet passing through a wired section.

(Step S12) The packet classification unit 12 recognizes the transmission-source IP address from the header information of the received packet, and classifies the received packet by transmission-source IP address.

(Step S13) The packet information recording unit 13a records the transmission-source IP address of the packet as packet information in the storage unit 14.

(Step S14) The communication classification unit 13b identifies the transmission-source IP address of the wireless LAN terminal on the basis of the recorded transmission-source IP address. Then, the communication classification unit 13b classifies the communication as wireless LAN communication or wired LAN communication. This step is to specify wireless LAN communication because, in addition to wireless LAN terminals, wired LAN terminals are allowed to be connected to access points.

In this connection, a range of IP addresses allocated to the wireless LAN terminals on the wireless LAN is determined in advance, and a list of the IP addresses of the wireless LAN terminals is stored in the storage unit 14 in advance.

(Step S15) The packet extraction unit 13c extracts a packet from the specified wireless LAN communication. The packet extracted by the packet extraction unit 13c is a packet that has been transmitted by the wireless LAN terminal and has passed through the wireless section and an access point, and thus is a packet to be analyzed (hereinafter, referred to as a target packet).

(Step S16) The non-communication period information recording unit 13d sets the attribute of the target packet to a default value (for example, "start"). The non-communication period information recording unit 13d then records the received time, communication information, and attribute set to the default value with respect to the target packet, as non-communication period information in the storage unit 14. For example, a transmission-source IP address is used as the communication information.

(Step S17) The packet interval calculation unit 13e calculates a packet interval between the target packet extracted last time and the target packet extracted this time (calculates a difference between these received times).

(Step S18) The non-communication period determination unit 13f compares the calculated packet interval with a threshold (for example, 10 msec). This threshold is used for determining that a packet interval is a non-communication period.

If the calculated packet interval is greater than or equal to the threshold, the non-communication period determination unit 13f determines that the calculated packet interval is a non-communication period, sets the attribute of the target packet extracted this time to "end" in the non-communication period information.

If the calculated packet interval is less than the threshold, the non-communication period determination unit 13f determines that the calculated packet interval is not a non-communication period, and keeps the attribute of "start" with respect to the target packet extracted this time.

(Step S19) The non-communication period comparison unit 13g determines whether the attribute of the received target packet is "end". If the attribute is "end", the process proceeds to step S20. If the attribute is "start", the process proceeds to step S11.

(Step S20) The non-communication period comparison unit 13g compares the non-communication period of the wireless LAN connection in question with the non-communication period of another wireless LAN connection. Then, the non-communication period comparison unit 13g records the comparison result as connected-access-point analysis information in the storage unit 14.

For example, the overlap proportions described earlier with reference to FIGS. 6 and 7 or the packet intervals described earlier with reference to FIGS. 8 and 9 are recorded as comparison results.

(Step S21) The same-access-point connection determination unit 13h determines whether the collection period for collecting target packets for the same-access-point connection determination has ended. If the collection period has ended, the process proceeds to step S22. If the collection period has not ended, the process proceeds to step S11.

(Step S22) The same-access-point connection determination unit 13h determines whether the number of target packets collected during the collection period or the number of non-communication periods in the collection period is adequate for performing the same-access-point connection determination. The same-access-point connection determination unit 13h excludes a collection period including an inadequate number of target packets or an inadequate number of non-communication periods. That is to say, the same-access-point connection determination unit 13h excludes the inappropriate collection period as an analysis period.

(Step S23) The same-access-point connection determination unit 13h determines whether two wireless LAN terminals are connected to the same access point, on the basis of the target packets collected during the collection period appropriate as an analysis period and using the comparison results obtained by the non-communication period comparison unit 13g. Then, the same-access-point connection determination unit 13h records the determination result as the connected-access-point analysis information in the storage unit 14.

For example, if an average of all overlap proportions is higher than or equal to the threshold, the same-access-point connection determination unit 13h determines that the two wireless LAN communication terminals are connected to the same access point, and records this determination result as the connected-access-point analysis information in the storage unit 14.

(Step S24) The packet analysis unit 13i analyzes the communication state between each wireless LAN terminal and the server 40. When detecting deterioration in the communication quality, the packet analysis unit 13i clarifies, based on the result of the same-access-point connection determination, which is the cause of the deterioration in the communication quality, the wireless LAN terminal or the access point.

Figure 11:
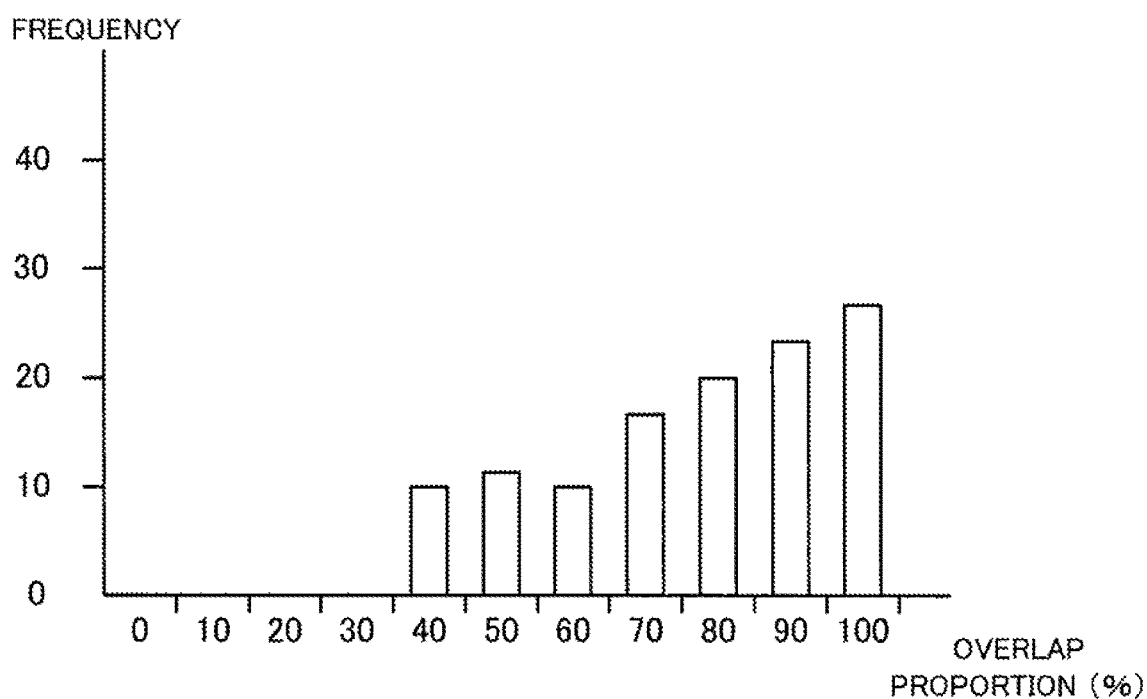
FIGS. 11 and 12 illustrate examples of actual measurement data regarding the overlap proportions between non-communication periods.
Figure 12:
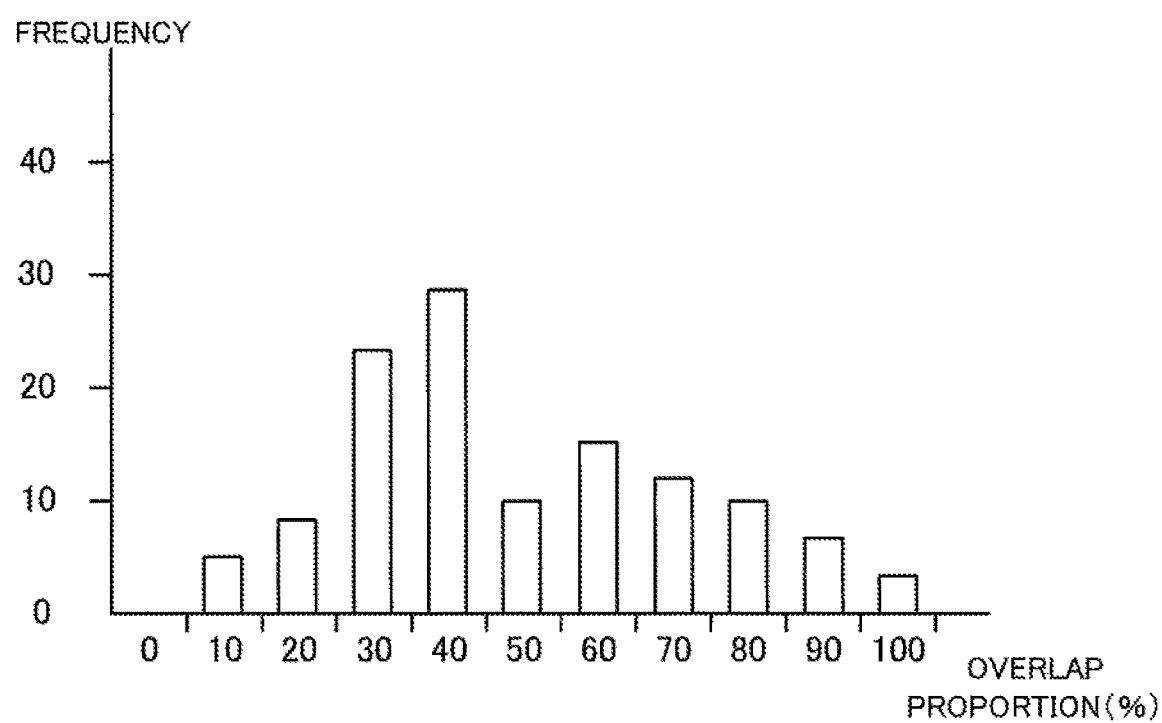

The following describes actual measurement data regarding the overlap proportions between non-communication periods. FIGS. 11 and 12 illustrate examples of actual measurement data regarding the overlap proportions between non-communication periods.

FIG. 11 illustrates the case where two wireless LAN terminals are connected to the same access point, whereas FIG. 12 illustrates the case where the two wireless LAN terminals are connected to different access points. The vertical axis represents the frequency of occurrences of a non-communication period, whereas the horizontal axis represents the overlap proportion (%) between non-communication periods.

Consider the case where non-communication periods overlap. Under the situation where two wireless LAN terminals are connected to the same access point, the overlap proportions of 70% to 100% frequently occur, as illustrated in FIG. 11. In addition, under the situation where two wireless LAN terminals are connected to different access points, the overlap proportions of 30% to 40% frequently occur, as illustrated in FIG. 12.

Therefore, it is possible to set, on the basis of these actual measurement data, the threshold that is used for performing the same-access-point connection determination by comparing the overlap proportions between non-communication periods with the threshold. For example, on the basis of the results of the actual measurement data illustrated in FIGS. 11 and 12, the threshold may be set to 70%.

In this case, the same-access-point connection determination unit 13h determines that two wireless LAN terminals 21 and 22 are connected to the same access point if the mode value or the median value of overlap proportions between the non-communication periods of the wireless LAN terminals 21 and 22 is higher than or equal to 70%. In addition, the same-access-point connection determination unit 13h determines that the two wireless LAN terminals 21 and 22 are connected to different access points if the mode value or the median value of overlap proportions between the non-communication periods of the wireless LAN terminals 21 and 22 is lower than 70%.

Figure 13:
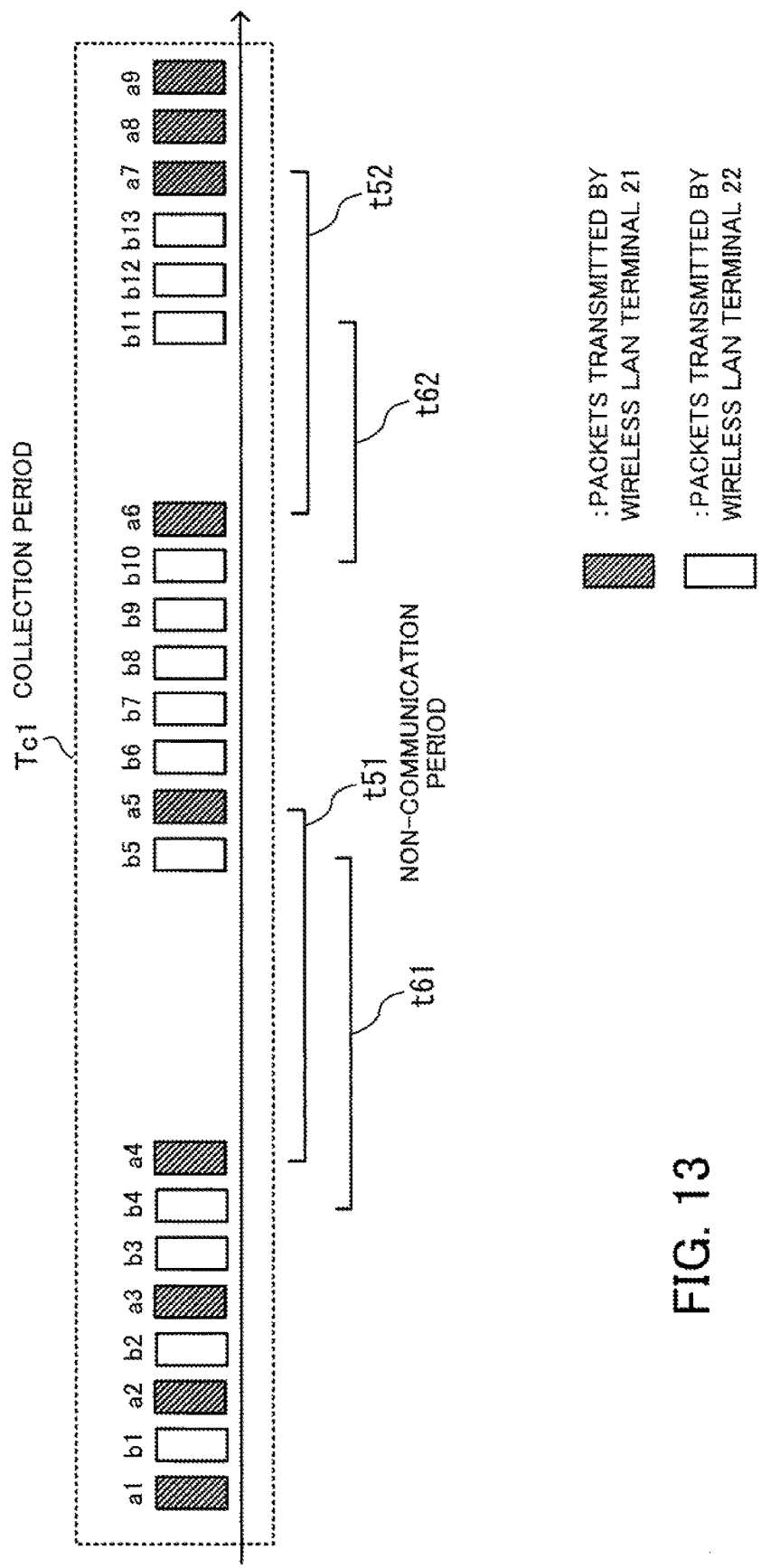
FIG. 13 illustrates an example of a collection period appropriate as an analysis period.

The following describes a collection period for the same-access-point connection determination. FIG. 13 illustrates an example of a collection period appropriate as an analysis period. A collection period that is determined appropriate as an analysis period includes a prescribed number or more of packets and a prescribed number or more of non-communication periods.

For example, an appropriate collection period is a time period during which a prescribed number or more of packets transmitted by one wireless LAN terminal are captured and a prescribed number or more of non-communication periods occur in the wireless LAN terminal in packet transmission state.

In addition to this, the appropriate collection period is a time period during which a prescribed number or more of packets transmitted by the other wireless LAN terminal are captured and a prescribed number or more of non-communication periods occur in the other wireless LAN terminal in packet transmission state. Such a collection period is treated as an appropriate collection period for the same-access-point connection determination.

Assume now that the following conditions are set for appropriateness of a collection period: a prescribed number of packets is nine and a prescribed number of non-communication periods is two, for example. Referring to the example of FIG. 13, packets a1 to a9 transmitted by the wireless LAN terminal 21 are captured during a collection period Tc1. In addition, while the wireless LAN terminal 21 is in the packet transmission state, a non-communication period t51 occurs between the packets a4 and a5, and a non-communication period t52 occurs between the packets a6 and a7. Therefore, with respect to the wireless LAN terminal 21, the number of packets and the number of non-communication periods satisfy the conditions.

In addition, during the collection period Tc1, packets b1 to b13 transmitted by the wireless LAN terminal 22 are captured. While the wireless LAN terminal 22 is in the packet transmission state, a non-communication period t61 occurs between the packets b4 and b5, and a non-communication period t62 occurs between the packets b10 and b11. Therefore, with respect to the wireless LAN terminal 22, the number of packets and the number of non-communication periods satisfy the conditions.

Thus, with respect to the collection period Tc1 of FIG. 13, the two wireless LAN terminals 21 and 22 both satisfy the conditions, and therefore the collection period Tc1 is considered appropriate as an analysis period.

Figure 14:
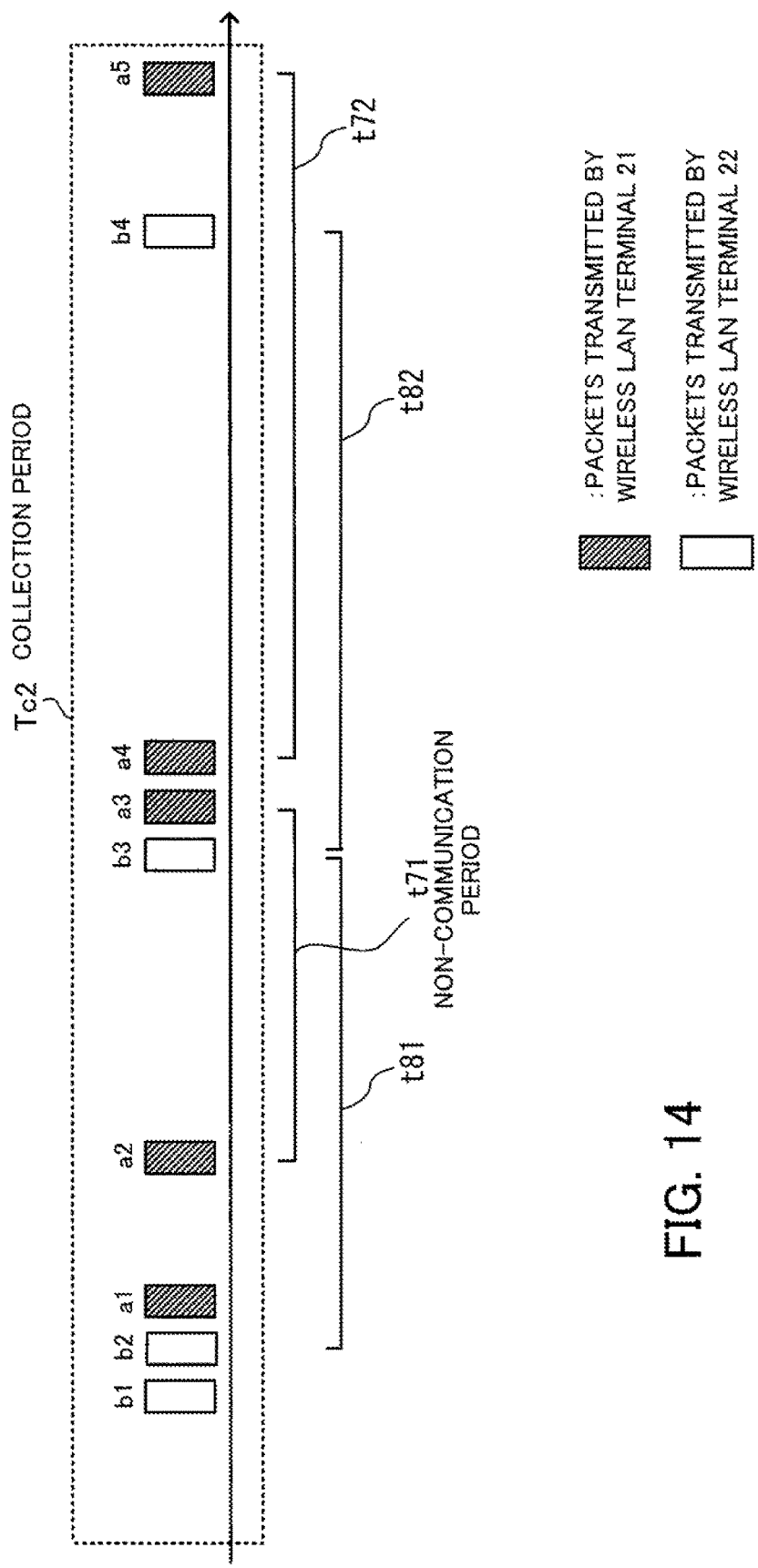
FIGS. 14 and 15 illustrate examples of a collection period inappropriate as an analysis period.

FIG. 14 illustrates an example of a collection period inappropriate as an analysis period. As an example of a collection period inappropriate as an analysis period, the following case will be described, where a prescribed number or more of packets are not captured during the collection period.

Assume now that the following conditions are set for appropriateness of a collection period: a prescribed number of packets is nine and a prescribed number of non-communication periods is two, for example. Referring to the example of FIG. 14, packets a1 to a5 transmitted by the wireless LAN terminal 21 are captured during a collection period Tc2. In addition, while the wireless LAN terminal 21 is in the packet transmission state, a non-communication period t71 occurs between the packets a2 and a3, and a non-communication period t72 occurs between the packets a4 and a5.

In this case, the number of non-communication periods satisfies the conditions, but the number of packets does not satisfy the conditions. Therefore, at this stage, the collection period Tc2 is determined inappropriate as an analysis period by the same-access-point connection determination unit 13*h*.

The wireless LAN terminal 22 will be considered for that matter. Packets b1 to b4 transmitted by the wireless LAN terminal 22 are captured. In addition, while the wireless LAN terminal 22 is in the packet transmission state, a non-communication period t81 occurs between the packets b2 and b3, and a non-communication period t82 occurs between the packets b3 and b4.

In this case, the number of non-communication periods satisfies the conditions, but the number of packets does not satisfy the conditions. Therefore, the collection period Tc2 is determined inappropriate as an analysis period.

Figure 15:
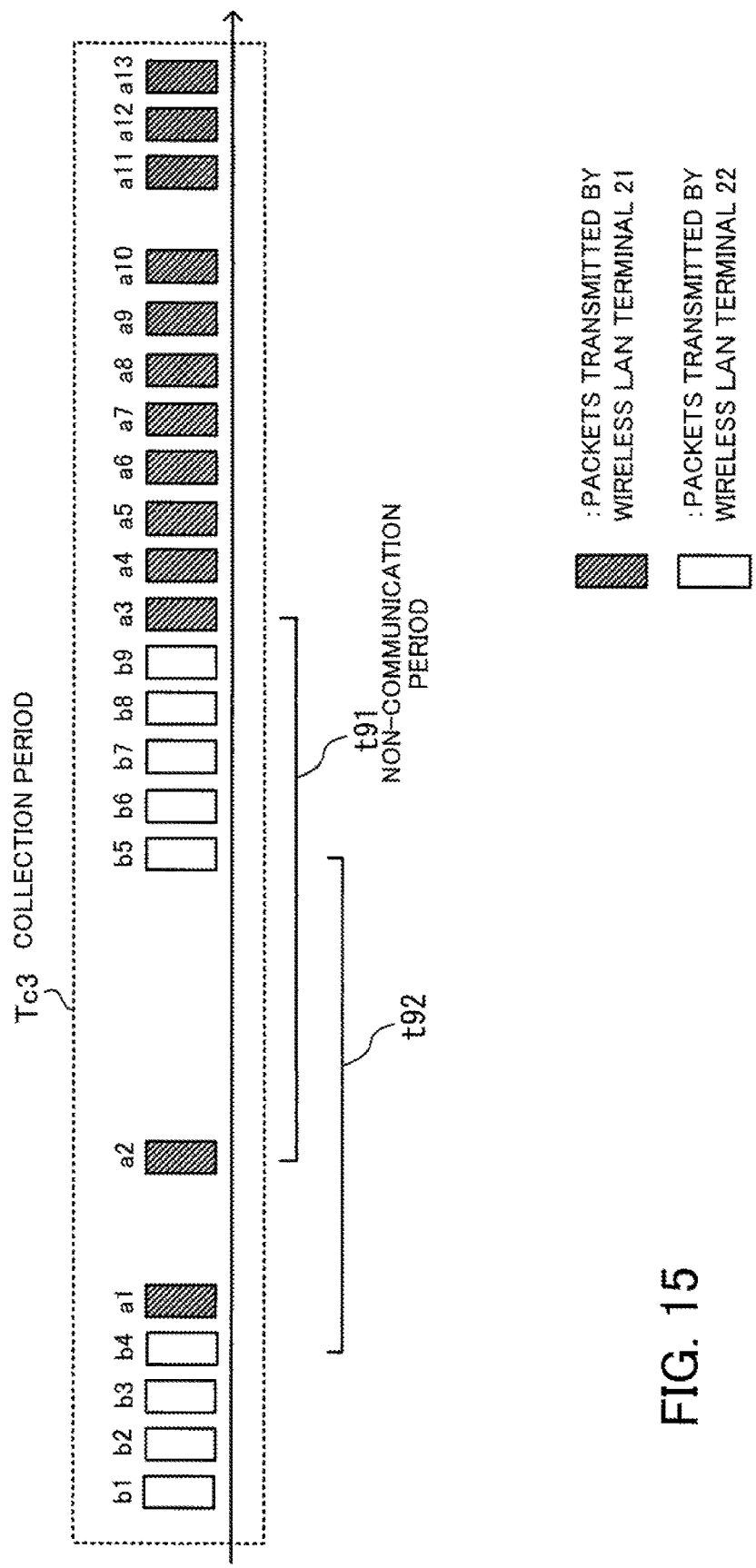

FIG. 15 illustrates an example of a collection period inappropriate as an analysis period. As an example of a collection period inappropriate as an analysis period, the following case will be described, where a prescribed number or more of non-communication periods do not occur in the collection period.

Assume now that the following conditions are set for appropriateness of a collection period: a prescribed number of packets is nine and a prescribed number of non-communication periods is two, for example. Referring to the example of FIG. 15, packets a1 to a13 transmitted by the wireless LAN terminal 21 are captured during a collection period Tc3. In addition, while the wireless LAN terminal 21 is in the packet transmission state, a non-communication period t91 occurs between the packets a2 and a3.

Therefore, the number of packets satisfies the conditions but the number of non-communication periods does not satisfy the conditions. Therefore, at this stage, the collection period Tc3 is determined inappropriate as an analysis period by the same-access-point connection determination unit 13*h*.

The wireless LAN terminal 22 will be considered for that matter. Packets b1 to b9 transmitted by the wireless LAN terminal 22 are captured. In addition, while the wireless LAN terminal 22 is in the packet transmission state, a non-communication period t92 occurs between the packets b4 and b5.

In this case, the number of packets satisfies the conditions, but the number of non-communication periods does not satisfy the conditions. Therefore, the collection period Tc3 is determined inappropriate as an analysis period.

In the manner described above, the same-access-point connection determination unit 13*h* checks if the number of packets in a packet group obtained during a fixed collection period and the number of non-communication periods detected in the collection period are adequate for the same-access-point connection determination. The same-access-point connection determination unit 13*h* then excludes a collection period with an inadequate number of packets or an inadequate number of non-communication periods. This approach makes it possible to perform the same-access-point connection determination for a collection period appropriate as an analysis period, which improves the accuracy of the same-access-point connection determination.

Figure 16:
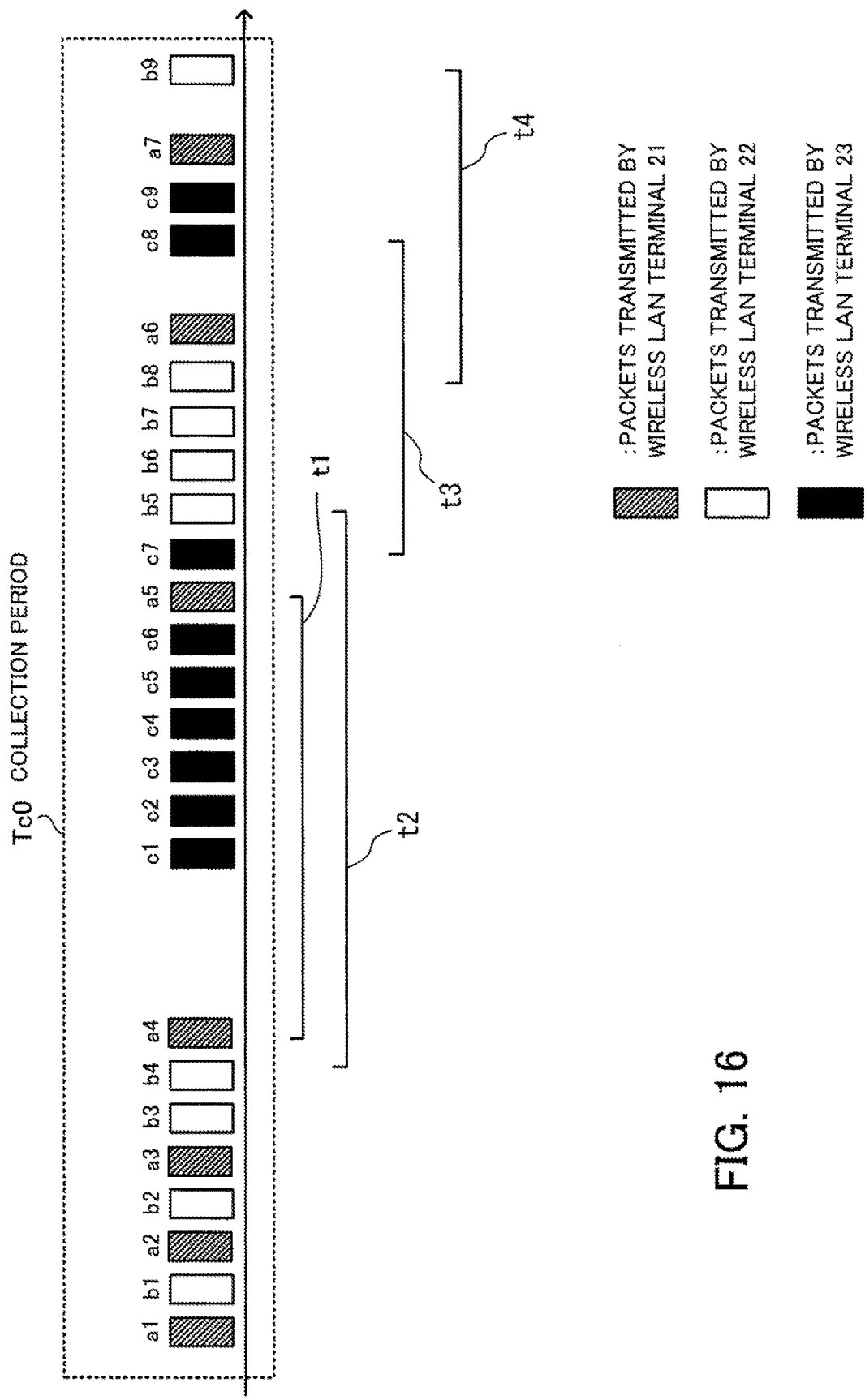
FIG. 16 illustrates an example of packets captured during a collection period.

The following describes how the same-access-point connection determination is performed, with reference to FIGS. 16 to 18. FIG. 16 illustrates an example of packets captured during a collection period. This example is that packet groups transmitted by three wireless LAN terminals 21, 22, and 23 are captured during a collection period Tc0 that is appropriate as an analysis period.

Packets a1 to a7 are packets that are transmitted by the wireless LAN terminal 21. In addition, while the wireless LAN terminal 21 is in the packet transmission state, a non-communication period t1 occurs between the packets a4 and a5.

Packets b1 to b9 are packets that are transmitted by the wireless LAN terminal 22. In addition, while the wireless LAN terminal 22 is in the packet transmission state, a non-communication period t2 occurs between the packets b4 and b5, and a non-communication period t4 occurs between the packets b8 and b9.

Packets c1 to c9 are packets that are transmitted by the wireless LAN terminal 23. In addition, while the wireless LAN terminal 23 is in the packet transmission state, a non-communication period t3 occurs between the packets c7 and c8.

FIG. 17 illustrates an example of a non-communication period information management table. The non-communication period information is stored and managed in a tabular form in the storage unit 14 as illustrated in FIG. 17. The non-communication period information management table TL1 includes the following items: packet received time, attribute (start or end), and communication information. The non-communication period information is recorded in order of receipt of packets by the packet receiving unit 11. By way of example, the entries of FIG. contain non-communication period information about packets captured during the collection period Tc0 of FIG. 16.

In this connection, the IP addresses of the wireless LAN terminals 21 to 23 may be used as the communication information. In the example of FIG. 17, the names identifying respective wireless LAN terminals, i.e., "wireless LAN terminal 21", "wireless LAN terminal 22", and "wireless LAN terminal 23", are used as the communication information, instead of IP addresses.

With respect to the wireless LAN terminal 21, the non-communication period t1 occurs between the packets a4 and a5. Therefore, the non-communication period information management table TL1 includes "start" as the attribute at the received time of the packet a4, and "end" as the attribute at the received time of the packet a5.

With respect to the wireless LAN terminal 22, the non-communication period t2 occurs between the packets b4 and b5, and the non-communication period t4 occurs between the packets b8 and b9.

Therefore, the non-communication period information management table TL1 includes "start" as the attribute at the received time of the packet b4 and "end" as the attribute at the received time of the packet b5, and "start" as the attribute at the received time of the packet b8, and "end" as the attribute at the received time of the packet b9.

With respect to the wireless LAN terminal 23, a non-communication period t3 occurs between the packets c7 and c8. Therefore, the non-communication period information management table TL1 includes "start" as the attribute at the received time of the packet c7 and "end" as the attribute at the received time of the packet c8.

The following describes how the non-communication period comparison unit 13g operates, with reference to the non-communication period information management table TL1.

(S31) The non-communication period comparison unit 13g does not perform a comparison because there is no packet with the attribute of "end" before reception of the packet a5 with the attribute of "end" and thus there is nothing to be compared with the non-communication period t1.

(S32) The non-communication period comparison unit 13g recognizes the packet a5 as another packet with the attribute of "end" before receipt of the packet b5 with the attribute of "end". In addition, the non-communication period t1 between the packets a4 and a5 and the non-communication period t2 between the packet b4 and b5 overlap. The non-communication period comparison unit 13g calculates the overlap proportions between the non-communication periods t1 and t2.

In this case, the non-communication period comparison unit 13g calculates the overlap proportion of the non-communication period t2 of the wireless LAN terminal 22 in the non-communication period t1 of the wireless LAN terminal 21. Further, the non-communication period comparison unit 13g calculates the overlap proportion of the non-communication period t1 of the wireless LAN terminal 21 in the non-communication period t2 of the wireless LAN terminal 22. Then, the non-communication period comparison unit 13g records the calculated overlap proportions as comparison results in the connected-access-point analysis information.

(S33) The non-communication period comparison unit 13g recognizes the packets a5 and b5 as other packets with the attribute of "end" before receipt of the packet c8 with the attribute of "end". In addition, the non-communication period t1 between the packets a4 and a5 and the non-communication period t3 between the packets c7 and c8 do not overlap, and the non-communication period t2 between the packets b4 and b5 and the non-communication period t3 overlap. Therefore, the non-communication period comparison unit 13g calculates the overlap proportions between the non-communication periods t2 and t3.

In this case, the non-communication period comparison unit 13g calculates the overlap proportion of the non-communication period t3 of the wireless LAN terminal 23 in the non-communication period t2 of the wireless LAN terminal 22. Further, the non-communication period comparison unit 13g calculates the overlap proportion of the non-communication period t2 of the wireless LAN terminal 22 in the non-communication period t3 of the wireless LAN terminal 23. Then, the non-communication period comparison unit 13g records the calculated overlap proportions as comparison results in the connected-access-point analysis information.

(S34) The non-communication period comparison unit 13g recognizes the packets a5, b5, and c8 as other packets with the attribute of "end" before receipt of the packet b9 with the attribute of "end". In addition, only the non-communication period t3 overlaps with the non-communication period t4. Therefore, the non-communication period comparison unit 13g calculates the overlap proportions between the non-communication periods t3 and t4.

In this case, the non-communication period comparison unit 13g calculates the overlap proportion of the non-communication period t4 of the wireless LAN terminal 22 in the non-communication period t3 of the wireless LAN terminal 23. In addition, the non-communication period comparison unit 13g calculates the overlap proportion of the non-communication period t3 of the wireless LAN terminal 23 in the non-communication period t4 of the wireless LAN terminal 22. Then, the non-communication period comparison unit 13g records the calculated overlap proportions as comparison results in the connected-access-point analysis information.

FIG. 18 illustrates an example of a connected-access-point analysis information table. The connected-access-point analysis information is stored and managed in a tabular form in the storage unit 14, as illustrated in FIG. 18. The connected-access-point analysis information table TL2 includes the following items: communication information, comparison result, and determination result.

As the communication information, the IP addresses of wireless LAN terminals are recorded, for example. In this connection, in FIG. 18, names identifying wireless LAN terminals are indicated, as in FIG. 17.

As a comparison result, an overlap proportion calculated by the non-communication period comparison unit 13g is recorded. As a determination result, a result of determining whether wireless LAN terminals are connected to the same access point, which is obtained by the same-access-point connection determination unit 13h, is recorded.

The entries of FIG. 18 contain connected-access-point analysis information about packets captured during the collection period Tc0 of FIG. 17. In this connection, "A % (first non-communication period–second non-communication period)" that is a comparison result in FIG. means that the overlap proportion of the second non-communication period in the first non-communication period is A %. In addition, the threshold for the overlap proportions is set to 80%, for example.

The comparison result and determination result corresponding to an entry with the communication information of "wireless LAN terminal 21" will be described. The comparison result indicates 100%. This is because, in step S32, the non-communication period comparison unit 13g calculates 100% as the overlap proportion of the non-communication period t2 of the wireless LAN terminal 22 in the non-communication period t1 of the wireless LAN terminal 21.

The determination result indicates "wireless LAN terminal 22 is connected to the same access point, and the wireless LAN terminal 23 is not connected to the same access point". Since the overlap proportion of 100% is higher than or equal to the threshold of 80%, the same-access-point connection determination unit 13h determines that the wireless LAN terminal 21 and the wireless LAN terminal 22 are connected to the same access point.

The comparison results and determination result corresponding to entries with the communication information of "wireless LAN terminal 22" will be described. The comparison results indicate 80%, 5%, and 30%. The comparison result of 80% means that, in step S32, the non-communication period comparison unit 13g calculates 80% as the overlap proportion of the non-communication period t1 of the wireless LAN terminal 21 in the non-communication period t2 of the wireless LAN terminal 22.

The comparison result of 5% means that, in step S33, the non-communication period comparison unit 13g calculates 5% as the overlap proportion of the non-communication period t3 of the wireless LAN terminal 23 in the non-communication period t2 of the wireless LAN terminal 22.

The comparison result of 30% means that, in step S34, the non-communication period comparison unit 13g calculates 30% as the overlap proportion of the non-communication period t3 of the wireless LAN terminal 23 in the non-communication period t4 of the wireless LAN terminal 22.

The determination result indicates "wireless LAN terminal 21 is connected to the same access point, and the wireless LAN terminal 23 is not connected to the same access point".

Since the overlap proportion of 80% is higher than or equal to the threshold of 80%, the same-access-point connection determination unit 13h determines that the wireless LAN terminal 22 and the wireless LAN terminal 21 are connected to the same access point. In addition, since the overlap proportions of 5% and 30% are lower than the threshold of 80%, the same-access-point connection determination unit 13h determines that the wireless LAN terminal 22 and the wireless LAN terminal 23 are not connected to the same access point.

The comparison results and determination result corresponding to entries with the communication information of "wireless LAN terminal 23" will be described. The comparison results indicate 10% and 50%. The comparison results of 10% mean that, in step S33, the non-communication period comparison unit 13g calculates 10% as the overlap proportion of the non-communication period t2 of the wireless LAN terminal 22 in the non-communication period t3 of the wireless LAN terminal 23.

The comparison result of 50% means that, in step S34, the non-communication period comparison unit 13g calculates 50% as the overlap proportion of the non-communication period t4 of the wireless LAN terminal 22 in the non-communication period t3 of the wireless LAN terminal 23.

The determination result indicates, with respect to the wireless LAN terminal 23, "wireless LAN terminal 21 is not connected to the same access point, and the wireless LAN terminal 22 is not connected to the same access point".

Since the overlap proportion of 10% is lower than the threshold of 80%, the same-access-point connection determination unit 13h determines that the wireless LAN terminal 23 and the wireless LAN terminal 21 are not connected to the same access point. In addition, the overlap proportion of 50% is lower than the threshold of 80%. Therefore, the same-access-point connection determination unit 13h determines that the wireless LAN terminal 23 and the wireless LAN terminal 22 are not connected to the same access point.

Figure 19B:
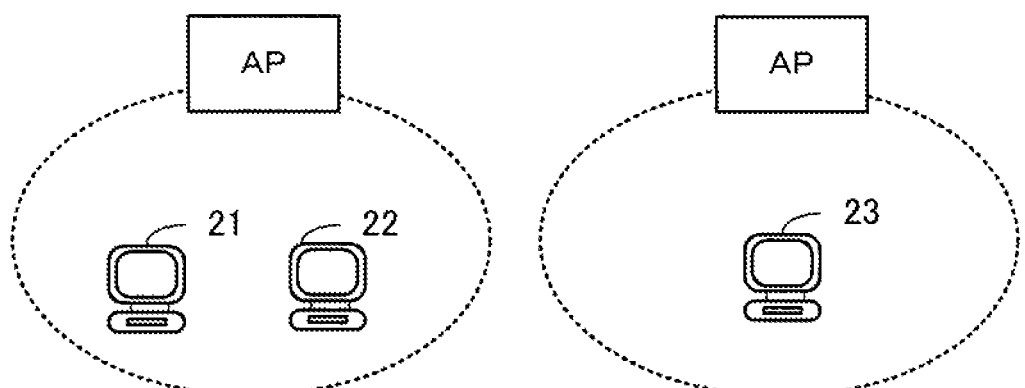

FIGS. 19A and 19B illustrate examples of an output result. The packet analysis apparatus 10 displays the connection states between wireless LAN terminals and access points as an output result on the monitor 201 of FIG. 4. More specifically, the display represents that, among the wireless LAN terminals 21 to 23, the wireless LAN terminals 21 and 22 are connected to the same access point.

The output result g1 is an example of displaying the states indicating whether a plurality of wireless LAN terminals are connected to the same access point or not, in a tabular form. The output result g1 indicates "0" mark in the common frames to the wireless LAN terminals 21 and 22, and "x" mark in the common frames to the wireless LAN terminals 21 and 23 and in the common frames to the wireless LAN terminals 22 and 23.

The output result g2 is an example of graphically displaying the connection states between the wireless LAN terminals and the access points. This output result g2 indicates that the wireless LAN terminals 21 and 22 are connected to the same access point, and the wireless LAN terminal 23 is connected to another access point.

Figure 20:
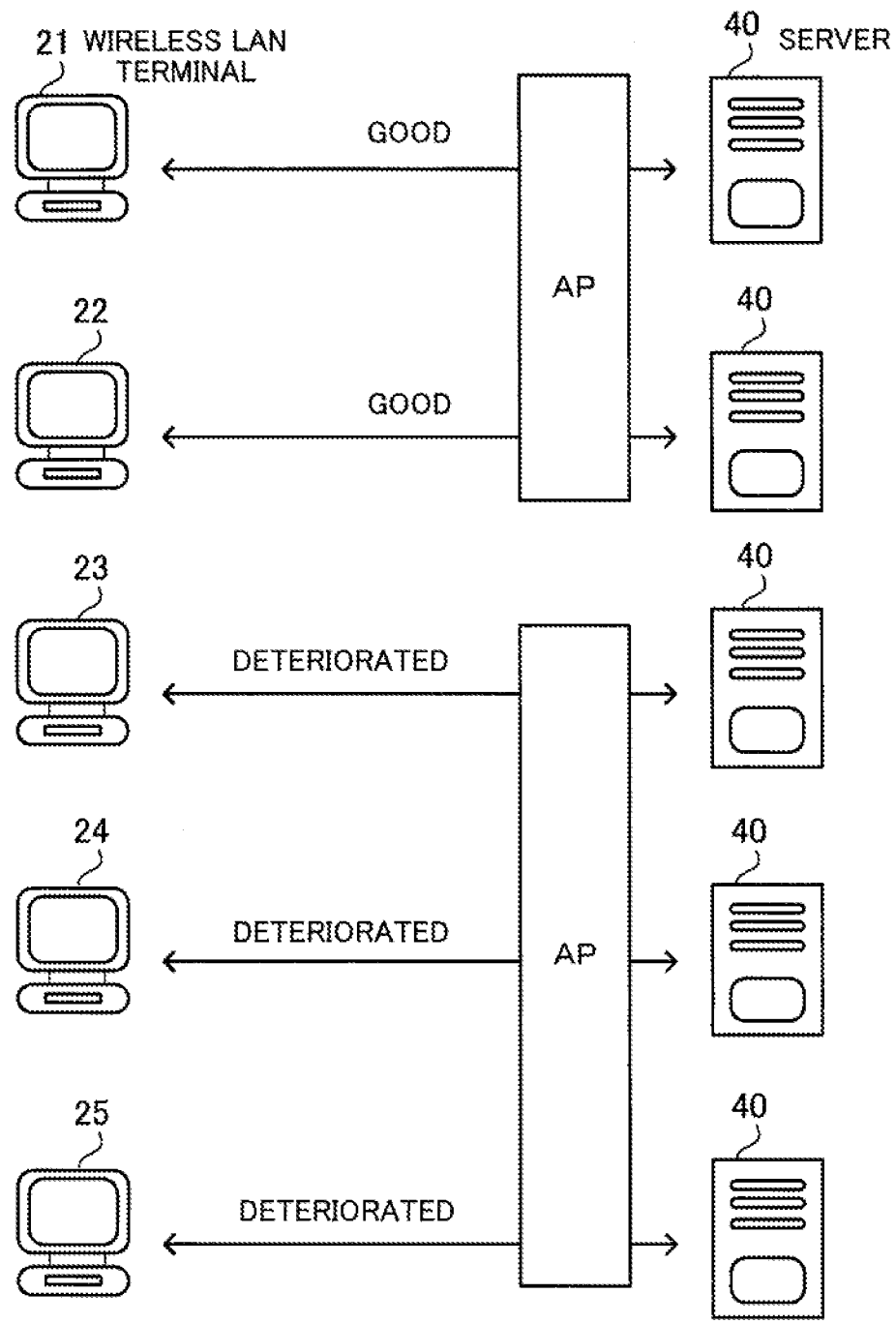
FIGS. 20 to 22 are views for explaining how to locate a point that is the cause of deterioration of communication quality.
Figure 21:
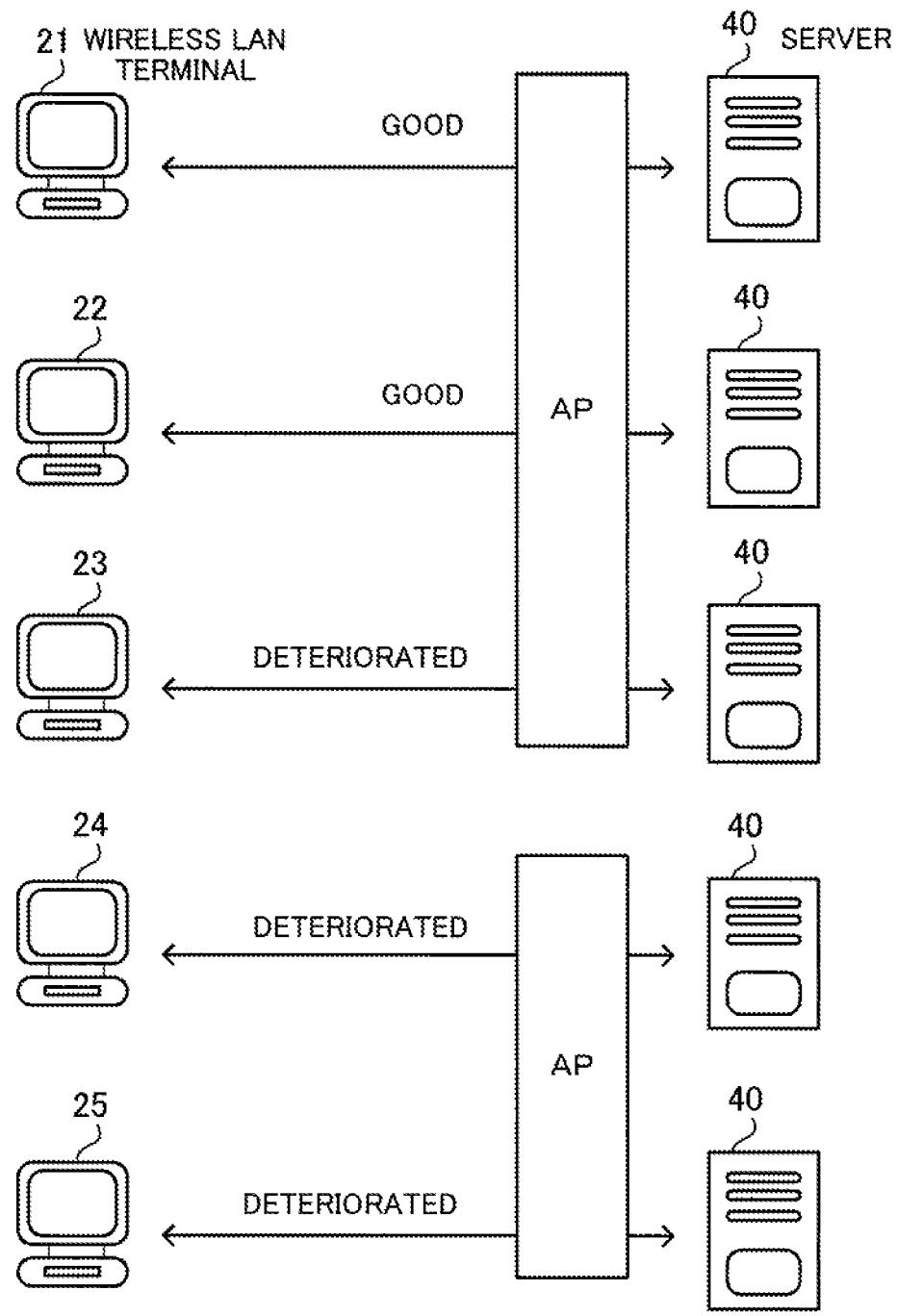

The following describes how to locate a point that is the cause of deterioration of communication quality, on the basis of the result of the same-access-point connection determination. FIGS. 20 and 21 are views for explaining how to locate a point that is the cause of deterioration of communication quality.

In FIGS. 20 and 21, the packet analysis unit 13i recognizes that the communication quality between the wireless LAN terminal 21 and the server 40 is good and the communication quality between the wireless LAN terminal 22 and the server 40 is good.

In addition, the packet analysis unit 13i recognizes that the communication quality between the wireless LAN terminal 23 and the server 40 is deteriorated, the communication quality between the wireless LAN terminal 24 and the server 40 is deteriorated, and the communication quality between the wireless LAN terminal 25 and the server 40 is deteriorated.

In FIG. 20, the packet analysis unit 13i recognizes based on the determination results obtained by the same-access-point connection determination unit 13h that the wireless LAN terminals 21 and 22 are connected to the same access point and the wireless LAN terminals 23 to 25 are connected to the same access point.

Since the wireless LAN terminals 23 to 25 with deteriorated communication quality are connected to the same access point, the packet analysis unit 13i determines that the access point is probably the cause of the deterioration.

In addition, in FIG. 21, the packet analysis unit 13i recognizes based on determination results obtained by the same-access-point connection determination unit 13h that the wireless LAN terminals 21, 22, and 23 are connected to the same access point and the wireless LAN terminals 24 and 25 are connected to the same access point.

With respect to the wireless LAN terminal 23 with deteriorated communication quality, the wireless LAN terminals 21, 22, and 23 are connected to the same access point, and the communication quality of the wireless LAN terminals 21 and 22 are good. Therefore, the packet analysis unit 13i determines that the wireless LAN terminal 23 is probably the cause of the deterioration.

Further, with respect to the wireless LAN terminals 24 and 25 with deteriorated communication quality, the wireless LAN terminals 24 and 25 are connected to the same access point. Therefore, the packet analysis unit 13i determines that the access point is probably the cause of the deterioration.

Figure 22:
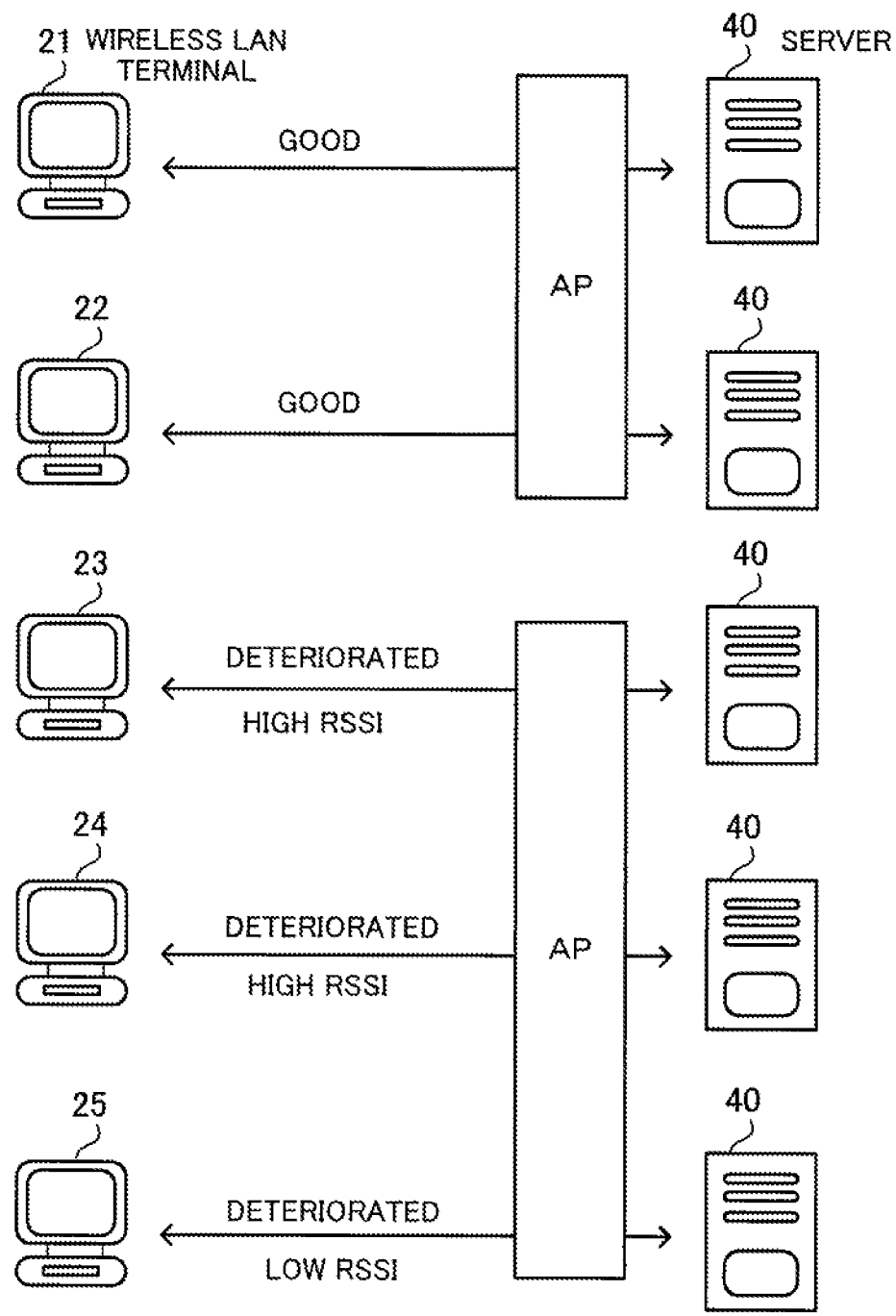

FIG. 22 is a view for explaining how to locate a point that is the cause of deterioration of communication quality. FIG. 22 illustrates the case where, although all wireless LAN terminals connected to the same access point have deteriorated communication quality, a wireless LAN terminal is recognized as being the cause of the deterioration.

In FIG. 22, the packet analysis unit 13i recognizes that the communication quality between the wireless LAN terminal 21 and the server 40 is good and the communication quality between the wireless LAN terminal 22 and the server 40 is good.

Further, the packet analysis unit 13i recognizes that the communication quality between the wireless LAN terminal 23 and the server 40 is deteriorated, the communication quality between the wireless LAN terminal 24 and the server 40 is deteriorated, and the communication quality between the wireless LAN terminal 25 and the server 40 is deteriorated.

Assume now that the packet analysis unit 13i recognizes that the Received Signal Strength Indicators (RSSI) of the wireless LAN terminals 23 and 24 are both high and sufficient for stable wireless LAN communication. In addition, assume that the packet analysis unit 13i recognizes that the RSSI of the wireless LAN terminal 25 is low and insufficient for the stable wireless LAN communication.

Among the wireless LAN terminals 23 to 25 with deteriorated communication quality, it is determined that the wireless LAN terminals 23 to 25 are connected to the same access point and that only the wireless LAN terminal 25 has a low RSSI.

Therefore, the packet analysis unit 13i determines that, among the wireless LAN terminals 23 to 25 connected to the same access point, the wireless LAN terminal 25 has a low RSSI, and this has caused the deterioration in the communication of the other wireless LAN terminals 23 and 24 subordinate to the same access point.

Heretofore, the embodiments have been exemplified. In this connection, the components described in the embodiments may be replaced with other components having equivalent functions or other components, or processing operations may be added. In addition, desired two or more configurations (features) in the embodiments may be combined.

According to one aspect, it is possible to locate a point that is the cause of deterioration of communication quality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing a computer program that causes a computer to perform a process comprising:

obtaining a first packet group and a second packet group at a prescribed point in a wired network, the first packet group being transmitted wirelessly by a first wireless communication apparatus and received by any of a plurality of wireless base stations connected to the wired network, the second packet group being transmitted wirelessly by the second wireless communication apparatus and received by any of the plurality of wireless base stations;

detecting a first non-communication period and a second non-communication period, based on captured times of packets included in the first packet group and the second packet group, the first non-communication period being a time period during which there are no packets transmitted by the first wireless communication apparatus for a prescribed time or longer, the second non-communication period being a time period during which there are no packets transmitted by the second wireless communication apparatus for the prescribed time or longer; and determining, based on an overlap between the first non-communication period and the second non-communication period, whether the first wireless communication apparatus and the second wireless communication apparatus are connected to a same wireless base station.

2. The non-transitory computer-readable recording medium according to claim 1, wherein the determining includes calculating a proportion of overlap period between the first non-communication period and the second non-communication period in the first non-communication period or the second non-communication period, and determining, when the proportion is higher than or equal to a threshold, that the first wireless communication apparatus and the second wireless communication apparatus are connected to the same wireless base station.

3. The non-transitory computer-readable recording medium according to claim 1, wherein the determining includes calculating, when the first non-communication period and the second non-communication period overlap, a packet interval being a difference between a captured time of a first packet captured immediately before or after the first non-communication period and a captured time of a second packet captured immediately before or after the second non-communication period, and determining, when the packet interval is less than or equal to a threshold, that the first wireless communication apparatus and the second wireless communication apparatus are connected to the same wireless base station.

4. The non-transitory computer-readable recording medium according to claim 1, wherein the determining includes excluding, when a number of packets included in at least one of the first packet group and the second packet group obtained during a collection period that is fixed is less than a prescribed value, the collection period as an analysis period.

5. The non-transitory computer-readable recording medium according to claim 1, wherein the determining includes excluding, when a number of non-communication periods detected in a collection period that is fixed is less than a prescribed value, the collection period as an analysis period.

6. A packet analysis method comprising:

obtaining, by a processor, a first packet group and a second packet group at a prescribed point in a wired network, the first packet group being transmitted wirelessly by a first wireless communication apparatus and received by any of a plurality of wireless base stations connected to the wired network, the second packet group being transmitted wirelessly by a second wireless communication apparatus and received by any of the plurality of wireless base stations;

detecting, by the processor, a first non-communication period and a second non-communication period, based on captured times of packets included the first packet group and the second packet group, the first non-communication period being a time period during which there are no packets transmitted by the first wireless communication apparatus for a prescribed time or longer, the second non-communication period being a time period during which there are no packets transmitted by the second wireless communication apparatus for the prescribed time or longer; and determining, by the processor, based on an overlap between the first non-communication period and the second non-communication period, whether the first wireless communication apparatus and the second wireless communication apparatus are connected to a same wireless base station.

7. A packet analysis apparatus comprising:
a processor configured to perform a process including obtaining a first packet group and a second packet group at a prescribed point in a wired network and storing the first packet group and the second packet group in a memory, the first packet group being transmitted wirelessly by a first wireless communication apparatus and received by any of a plurality of wireless base stations connected to the wired network, the second packet group being transmitted wirelessly by the second wireless communication apparatus and received by any of the plurality of wireless base stations, detecting a first non-communication period and a second non-communication period, based on captured times of packets included in the first packet group and the second packet group, the first non-communication period being a time period during which there are no packets transmitted by the first wireless communication apparatus for a prescribed time or longer, the second non-communication period being a time period during which there are no packets transmitted by the second wireless communication apparatus for the prescribed time or longer, and determining, based on an overlap between the first non-communication period and the second non-communication period, whether the first wireless communication apparatus and the second wireless communication apparatus are connected to a same wireless base station.

* * * * *